US012072701B2

(12) United States Patent
Kim et al.

(10) Patent No.: US 12,072,701 B2
(45) Date of Patent: Aug. 27, 2024

(54) CONTROL METHOD AND SYSTEM FOR ROBOT

(71) Applicant: NAVER LABS CORPORATION, Seongnam-si (KR)

(72) Inventors: Kahyeon Kim, Seongnam-si (KR); Seijin Cha, Seongnam-si (KR)

(73) Assignee: NAVER LABS CORPORATION, Gyeonggi-Do (KR)

( * ) Notice: Subject to any disclaimer, the term of this patent is extended or adjusted under 35 U.S.C. 154(b) by 350 days.

(21) Appl. No.: 17/458,952

(22) Filed: Aug. 27, 2021

(65) Prior Publication Data
US 2022/0066446 A1 Mar. 3, 2022

(30) Foreign Application Priority Data

Aug. 27, 2020 (KR) .......... 10-2020-0108503
Jun. 24, 2021 (KR) .......... 10-2021-0082285

(51) Int. Cl.
*G05D 1/00* (2024.01)
*G06F 3/04847* (2022.01)
(Continued)

(52) U.S. Cl.
CPC ......... *G05D 1/0038* (2013.01); *G05D 1/0033* (2013.01); *G06V 10/443* (2022.01);
(Continued)

(58) Field of Classification Search
CPC .. G05D 1/0022; G05D 1/0033; G05D 1/0038; G05D 2201/0206;
(Continued)

(56) References Cited

U.S. PATENT DOCUMENTS 10,387,733 B2* 8/2019 Yokota .................... G06T 7/277
10,800,258 B2* 10/2020 Tauchi .................. B60K 35/00
(Continued)

FOREIGN PATENT DOCUMENTS

CN 110869866 A 3/2020
JP 2011-85999 A 4/2011
(Continued)

OTHER PUBLICATIONS

English translation of KR Publication 1020100004626 (Year: 2010).*
(Continued)

*Primary Examiner* — Russell Frejd
*Assistant Examiner* — Brandon Z Willis
(74) *Attorney, Agent, or Firm* — Harness, Dickey & Pierce, P.L.C.

(57) ABSTRACT

A robot control method includes receiving an image of a space where a robot drives; receiving driving information related to driving of the robot, from the robot; controlling a display unit to output a graphic object corresponding to the driving information, together with the image; and determining a visual characteristic of the graphic object based on the driving information, wherein the controlling includes controlling the display unit to output the graphic object in an overlapping manner with the image.

17 Claims, 15 Drawing Sheets

(51) Int. Cl.
*G06V 10/44* (2022.01)
*G06V 20/20* (2022.01)
*G06V 20/56* (2022.01)
*H04L 67/10* (2022.01)

(52) U.S. Cl.
CPC ............ *G06V 20/20* (2022.01); *G06V 20/588* (2022.01); *H04L 67/10* (2013.01); *G05D 1/0022* (2013.01); *G06F 3/04847* (2013.01)

(58) Field of Classification Search
CPC ........... G05D 2201/0211; G06V 10/10; G06V 10/255; G06V 10/44; G06V 10/443; G06V 20/20; G06V 20/176; G06V 20/36; G06V 20/54; G06V 20/588; G06V 20/58; G06V 2201/10; H04L 67/10; G06F 3/04847; G06F 3/04845; G06F 3/04815; B25J 9/1664; B25J 9/1666; B25J 9/1674; B25J 9/1676; B25J 9/1679; B25J 9/1697; B25J 9/1602; B25J 9/1689; B25J 13/006; B25J 19/021; B25J 19/023
See application file for complete search history.

(56) References Cited

U.S. PATENT DOCUMENTS

| | | | |
|---|---|---|---|
| 2019/0227543 A1 | 7/2019 | Choe et al. | |
| 2019/0235490 A1* | 8/2019 | Tsusaka | G05D 1/0033 |
| 2020/0012287 A1* | 1/2020 | Lee | G01S 17/931 |
| 2021/0209367 A1* | 7/2021 | Korjus | G06V 20/56 |

FOREIGN PATENT DOCUMENTS

| | | | |
|---|---|---|---|
| JP | 2011085999 | * | 4/2011 |
| JP | 2018-000383 | | 1/2018 |
| JP | 2018-125816 | A | 8/2018 |
| JP | 2019-133450 | A | 8/2019 |
| KR | 10-2010-0004626 | A | 1/2010 |
| KR | 1020100004626 | * | 1/2010 |
| KR | 10-1305944 | B1 | 9/2013 |
| KR | 10-2018-0038870 | A | 4/2018 |
| KR | 10-2018-0039439 | A | 4/2018 |
| KR | 10-2019-0095578 | A | 8/2019 |
| WO | WO-2005/015466 | A1 | 2/2005 |
| WO | WO-2018/066054 | A1 | 4/2018 |
| WO | WO-2018155159 | A1 | 8/2018 |
| WO | WO-2018159315 | A1 | 9/2018 |

OTHER PUBLICATIONS

English translation of JP Publication 2011085999 (Year: 2011).*
Japanese Office Action Corresponding to Application No. 2021-136951, dated Feb. 28, 2023.
Office Action Corresponding to Korean Application No. 10-2021-0082285, mailed Apr. 23, 2024.

* cited by examiner (a)  (b)  (c)

(a)

(b)

CONTROL METHOD AND SYSTEM FOR ROBOT

CROSS-REFERENCE TO RELATED APPLICATION

Pursuant to 35 U.S.C. § 119(a), this application claims the benefit of earlier filing date and right of priority to Korean Application Nos. 10-2020-0108503, filed on Aug. 27, 2020, and 10-2021-0082285, filed on Jun. 24, 2021, the entire contents of each of which are incorporated, herein, by reference.

BACKGROUND

1. Field

At least some example embodiments relate to a control method and system for a robot, and particularly, to a control method and system for a robot capable of remotely managing and controlling a robot.

2. Related Art

As technology advances, various service devices emerge. Especially in recent years, technology development for robots that perform various tasks or services is actively ongoing.

Furthermore, recently, as artificial intelligence technologies and cloud technologies have evolved, the utilization of robots is gradually increased.

On the other hand, in order to provide various tasks or services with robots, it is very important to control the robot accurately. However, the needs for techniques to remotely manage and control robots become important gradually, as there are realistic limitations for users to perform a control over robots one by one therearound.

Thus, Korean Patent Registration No. 10-1305944 (A remote control method for a robot using wrap-around images and a device therefor), discloses a technique to remotely manage and control a robot by providing cameras around the robot, acquiring images around the robot, and using the acquired images.

However, in case of remotely managing driving of the robot by using only the cameras provided at the robot, there may occur a problem that a surrounding situation of the robot cannot be immediately handled. Therefore, there are still needs for a control system that can more intuitively provide information related to driving of the robot.

SUMMARY

Therefore, an aspect of the detailed description is to provide a robot control method and system. More specifically, an object of at least some example embodiments is to provide a robot control method and system capable of remotely managing and controlling a robot more intuitively.

More specifically, an object of at least some example embodiments is to provide a robot control method and system capable of providing a user interface which can flexibly handle a dangerous situation which may occur when a robot drives.

According to at least some example embodiments, a robot control method includes receiving an image of a space where a robot drives; receiving driving information related to driving of the robot, from the robot; controlling a display unit to output a graphic object corresponding to the driving information, together with the image; and determining a visual characteristic of the graphic object based on the driving information, wherein the controlling includes controlling the display unit to output the graphic object in an overlapping manner with the image.

The graphic object may include a plurality of regions sequentially arranged in one direction, and The visual characteristic of the graphic object may be related to an area of each of the plurality of regions in the graphic object.

Each of the plurality of regions may match with a different risk level related to driving of the robot, and each of the plurality of regions may be arranged in a gradually-distant direction from the robot.

A first level having a highest risk among the different risk levels may be matched with a first region nearest to the robot among the plurality of regions, and a second level having a lowest risk among the different risk levels may be matched with a second region farthest from the robot among the plurality of regions.

The determining of the visual characteristic may include determining an area of each of the first region and the second region in the graphic object based on the driving information.

The driving information may include a driving speed of the robot, the determining of the visual characteristic may include in response to the driving speed of the robot is increasing, determining the areas of the first and second regions in the graphic object such that the area of the first region in the graphic object is larger than the area of the second region, and in response to the driving speed of the robot decreasing, determining the areas of the first and second regions in the graphic object such that the area of the first region in the graphic object is smaller than the area of the second region.

The first region and the second region may be displayed in different colors.

The method may further include sensing, from the image, a dynamic object positioned in the space, wherein the determining of the visual characteristic further includes changing the areas of the first region and the second region based on at least one a moving direction and a moving speed of the dynamic object in the space.

The determining of the visual characteristic may further include changing at least one of a length and a width of the graphic object is changed based on a driving speed of the robot.

The image may be received from a camera having a driving direction of the robot as an angle of view, and the first region and the second region may be sequentially arranged in one direction which is towards an upper side of the display unit from a lower side.

The image may be received from a camera arranged in the space, the image may include a robot image corresponding to the robot, and the graphic object may be output to the periphery of the robot image based on a driving direction of the robot.

According to at least some example embodiments of the inventive concepts, a robot control system includes a display unit; a communication unit configured to receive an image about a space where a robot drives, and driving information related to driving of the robot; and a controller configured to control the display unit to output a graphic object corresponding to the driving information, together with the image, wherein the controller is further configured to control the display unit to output the graphic object in an overlapping manner with the image, at a position corresponding to a driving direction of the robot.

According to at least some example embodiments, a system includes an indoor region, of a building, for a robot to drive in according to a safe guide line included in the indoor region; a plurality of cameras arranged in the indoor region; and a cloud server configured to communicate with the robot to receive an image about a space where the robot drives from the cameras, wherein the cloud server is further configured to control a display unit to output a graphic object related to safety information for safely driving the robot in the indoor region, together with the image, and wherein the cloud server is further configured to determine a visual characteristic of the graphic object based on driving information of the robot.

The cloud server may further be configured to control the display unit such that outputting of the graphic object includes outputting the graphic object in an overlapping manner with the image, wherein the graphic object includes a plurality of regions sequentially arranged in one direction, and wherein the visual characteristic of the graphic object is related to an area of each of the plurality of regions in the graphic object.

Each of the plurality of regions may match with a different risk level related to driving of the robot, and each of the plurality of regions may be arranged in a gradually-distant direction from the robot.

A first level having a highest risk among the different risk levels is matched with a first region nearest to the robot among the plurality of regions, and wherein a second level having a lowest risk among the different risk levels is matched with a second region farthest from the robot among the plurality of regions.

The cloud server may further be configured to determine an area of each of the first region and the second region in the graphic object based on the driving information.

As aforementioned, in the robot control method and system, an image may be received from the robot, and a graphic object related to driving information of the robot may be displayed on the received image.

More specifically, according to at least some example embodiments, information for preventing a dangerous situation (e.g., a situation of a collision risk, etc.) which may occur due to driving of the robot may be provided through utilization of a graphic object. Thus, a manager who remotely manages the robot may stably manage and operate the robot even in a remote place, by referring to the graphic object.

BRIEF DESCRIPTION OF THE DRAWINGS

The above and other features and advantages of example embodiments will become more apparent by describing in detail example embodiments with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
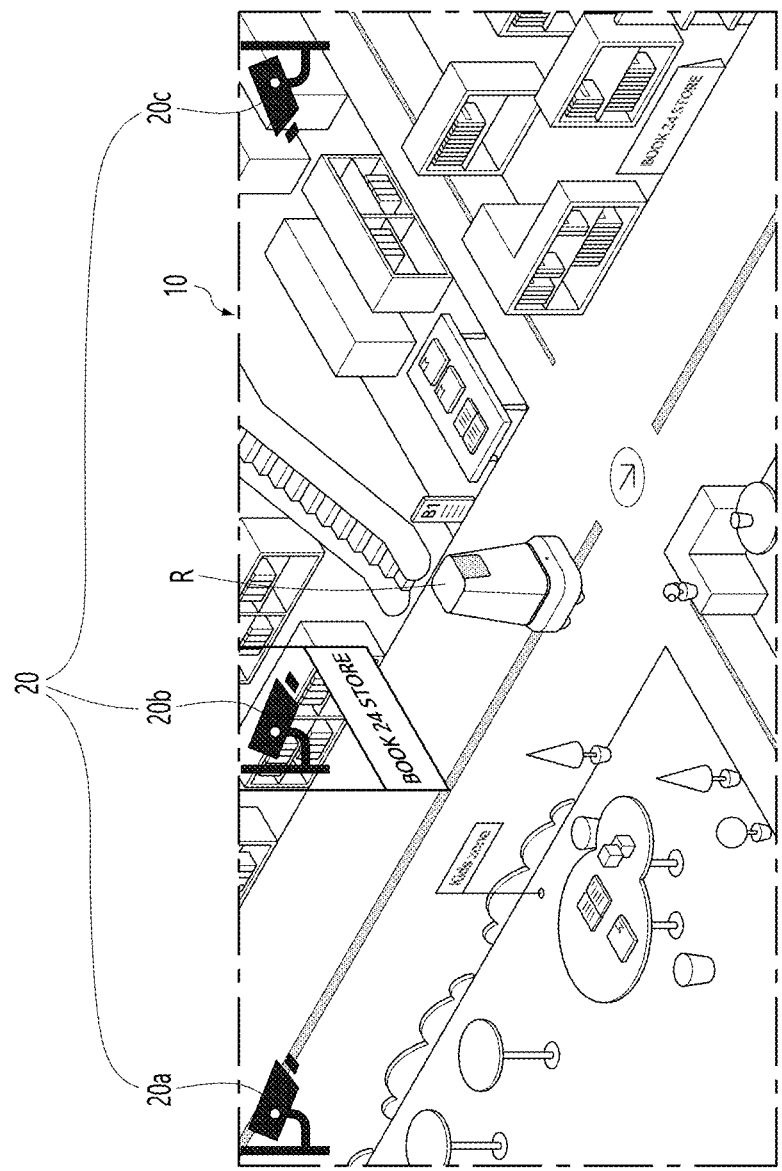
FIGS. 1 and 2 are conceptual views illustrating a robot control method and system according to at least some example embodiments.
Figure 1:
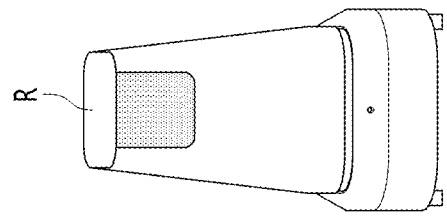

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Figure 2:
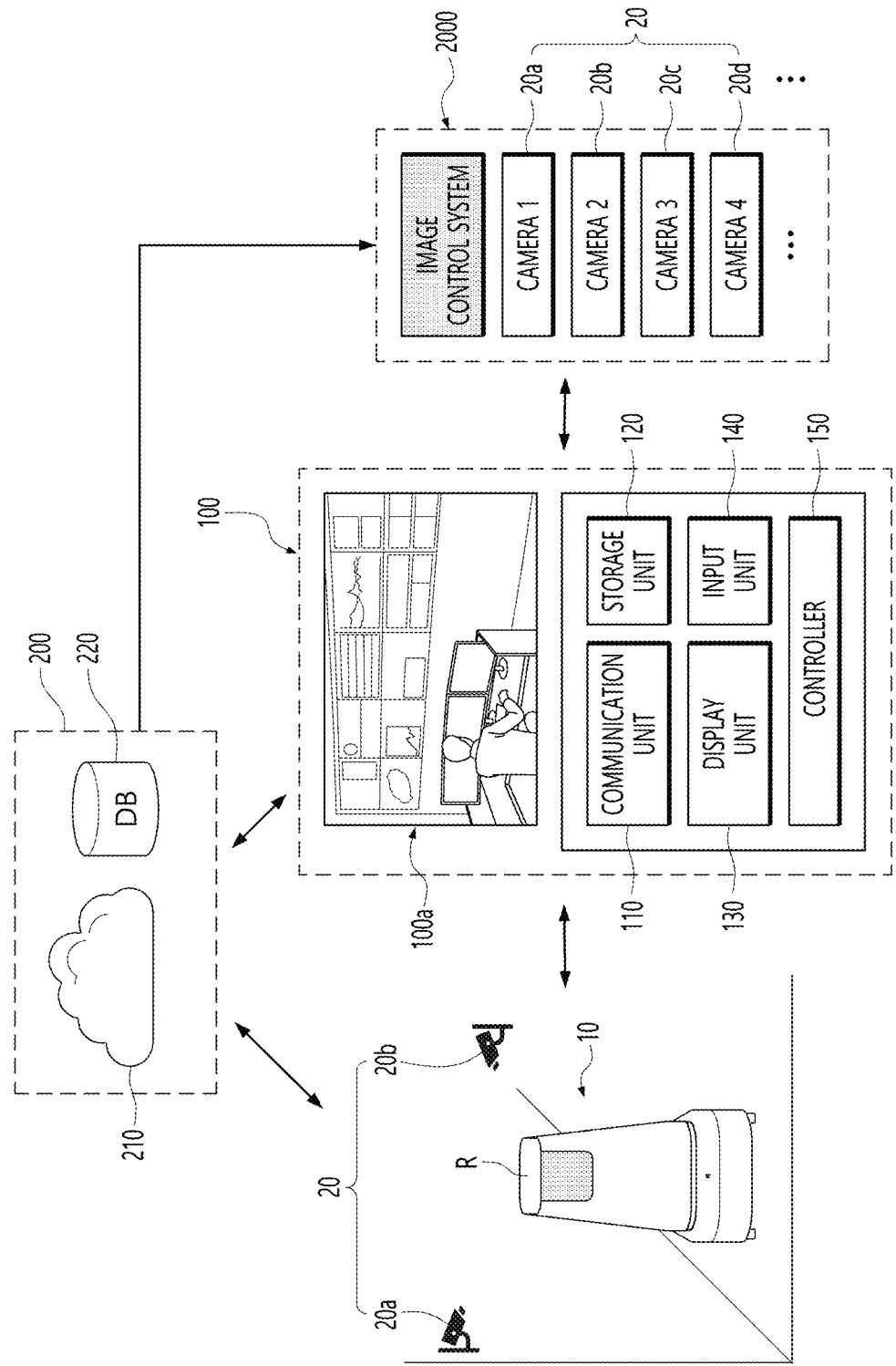

At least some example embodiments may provide a robot control method and system, more particularly, provides a method and system that remotely manage and control a robot more intuitively. Hereinafter, a space where a robot drives (moves) and a robot control system surrounding the space will be described with reference to the accompanying drawings. FIGS. 1 and 2 are conceptual views illustrating a robot control method and system according to at least some example embodiments.

As shown in FIG. 1, as technology advances, the utilization of robots increases gradually. Robots have traditionally been used in special industries (e.g., industrial automation related fields), but are being gradually transformed into service robots that can perform useful tasks for humans or facilities.

A robot capable of providing such diverse services may be configured to drive in the space 10 as shown in FIG. 1, to perform assigned tasks. There is no limitation in the type of space in which the robot drives, and the robot can be made to drive at least one of indoor and outdoor spaces as needed. For example, the indoor spaces may be a variety of spaces, such as department stores, airports, hotels, schools, buildings, subway stations, train stations and bookstores. The robot may be arranged in various spaces to provide useful services to humans.

Meanwhile, at least some example embodiments relate to a robot-friendly building, and proposes a robot-friendly building capable of allowing a human and a robot to coexist safely, and capable of providing a profitable service by a robot in the building.

More specifically, at least some example embodiments may provide a method to provide a service useful to a human by using a robot, a robot-friendly infra, and various systems controlling the same. In the building according to at least some example embodiments, may be provided various infrastructures (or facility infrastructures) that allow a human and a robot to coexist and allows a plurality of robots to freely move in the building.

According to at least some example embodiments, the building is a structure constructed for dwelling which may include the aforementioned indoor spaces, living, business, etc. And the building may have various types such as a commercial building, an industrial building, an organization building, a residence building, etc. Also, the building may be a multi-story building having a plurality of floors, or a one-story building.

Further, in a building according to at least some example embodiments, a robot may provide various services in the building safely and precisely as at least one of the building, various facility infrastructures provided in the building, and the robot is controlled in an interworking manner.

Meanwhile, in order to provide a variety of services using a robot, accurate control of the robot is a very important factor. Thus, at least some example embodiments provide a method to remotely and more accurately control a robot using a camera placed in a space together.

As shown in FIG. 1, a camera 20 may be placed in the space 10 where the robot is located. As shown, the number of the cameras 20 placed in the space 10 is unlimited. Multiple cameras 20a, 20b and 20c may be placed in the space 10 as shown. The types of the cameras 20 placed in the space 10 may be various, and according to at least some example embodiments, a closed circuit television (CCTV) placed in the space may be utilized in particular.

As shown in FIG. 2, at least some example embodiments allow remote management and control of the robot (R) by a robot control system 100.

According to at least some example embodiments, "control" may be used as a comprehensive term that includes the meaning that robots may be managed, monitored, or controlled remotely. In other words, an operation (e.g., driving) of the robot (R) which is a subject to control may be controlled based on a control command received from the robot control system 100 according to at least some example embodiments.

The robot control system 100 according to at least some example embodiments may utilize images received from the cameras 20, (e.g., CCTVs) placed in the space 10 to remotely monitor the robot or perform appropriate control.

Below, a method to utilize images received from the CCTVs placed in the space for robot control will be described more specifically.

As shown in FIG. 2, the robot control system 100 according to at least some example embodiments may include at least one of a communication unit 110, a storage unit 120, a display unit 130, an input unit 140, and a controller 150.

The communication unit 110 may be configured to communicate with a variety of devices placed in the space 10 in a wired or wireless manner. The communication unit 110 may communicate with the robot (R) as shown in the drawings. The communication unit 110 may be configured to communicate with the robot (R) to receive images captured from a camera provided at the robot (R).

Furthermore, the communication unit 110 may perform direct communication with the cameras 20. Furthermore, the communication unit 110 may be configured to communicate with an image control system 2000 that controls the cameras 20. In the event of communication between the image control system 2000 and the communication unit 110, the robot control system 100 may receive images captured (or received) by the cameras 20 from the image control system 2000 via the communication unit 110.

Furthermore, the communication unit 110 may be configured to communicate with at least one external server (or external storage unit 200). Here, the external server 200 may be configured to include at least one of a cloud server 210 and a database 220 as shown. The external server 200 may be configured to perform at least a part of the controller 150. In other words, performance such as data processing or data computation may be performed on the external server 200, and at least some example embodiments do not impose any particular restrictions on this approach. Thus, in this specification, the controller 150 may be referred to as an external server or a cloud server, etc.

According to at least some example embodiments, any or all of the external server 200, the image control system 2000 and the controller 150 may include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. The processing circuitry of the external server 200 and/or image control system 2000 may be configured, via hardware and/or software (e.g., firmware), to perform and/or control any operation described in the specification as being performed by an external storage unit, an external server, an image control system, an external camera, a controller, a robot control system, or an element of any of the same.

Meanwhile, the communication unit 110 may support a variety of communication methods according to communication standards of devices with which it communicates.

For instance, the communication unit 110 may be configured to communicate with a device (including a cloud server) located in and out of the space 10, using at least one of WLAN(Wireless LAN), Wi-Fi(Wireless-Fidelity), Wi-Fi (Wireless-Fidelity) Direct, DLNA(Digital Living Network Alliance), WiBro(Wireless Broadband), WiMAX(World Interoperability for Microwave Access), HSUPA(High Speed Uplink Packet Access), LTE(Long Term Evolution-Advanced), 5G(5th Generation Mobile Telecommunication), Bluetooth™, RFID(Radio Frequency Identification), Infrared Data Association; IrDA, UWB(Ultra-Wideband), ZigBee, NFC(Near Field Communication), and Wireless USB(Wireless Universal Serial Bus). According to at least some example embodiments, the communication unit 110 may be implemented by circuits or circuitry. Accordingly, the communication unit 110 may also be referred to in the present specification as communication circuitry 110.

Next, the storage unit 120 may be configured to store various information related to at least some example embodiments. According to at least some example embodiments, the storage unit 120 may be provided at the robot control system 100 itself. In contrast, at least a part of the storage unit 120 may mean at least one of the cloud server 210 and the database 220. For example, it can be understood that the storage unit 120 is sufficient if necessary information for robot control according to at least some example embodiments is stored therein, and there is no constraint on physical space. Thus, the storage unit 120, the cloud server 210 and the database 220 are not separately identified, but all of them are described as the storage unit 120. Here, the cloud server 210 may mean "cloud storage". Furthermore, the storage unit 120 may be configured to store not only information about the robot control system 100, but also various information related to the image control system 2000.

First, in the storage unit 120, information about the robot (R) may be stored.

Information about the robot (R) may vary widely and may include, for example, i) identification information (for instance, serial numbers, TAG information, QR code information, and etc.) for identifying the robot (R) placed in the space 10, ii) task information assigned to the robot (R), iii) driving path information set to the robot (R), iv) location information of the robot (R), v) status information of the robot (R) (for example, a power condition, presence of a malfunction, a battery condition, etc.), vi) image information received from the camera provided at the robot (R), etc.

Next, in the storage unit 120, information about the cameras 20 may be stored.

Information about the cameras 20 may vary widely, and information about the cameras 20 may include i) identification information of each camera 20a, 20b, 20c, 20d . . . (e.g., serial number, TAG information, QR code information, etc.), ii) arrangement information of each camera 20a, 20b, 20c, 20d . . . (for instance, information on an arrangement location of each camera 20a, 20b, 20c, 20d . . . in the space), iii) information on an angle of view of each camera 20a, 20b, 20c, 20d . . . (for instance, which view of the space is being captured by each camera 20a, 20b, 20c, 20d . . . ), iv) status information of each camera 20a, 20b, 20c, 20d . . . (for instance, a power state, presence of a malfunction, a battery state, etc.), v) information on images received from each camera 20a, 20b, 20c, 20d . . . , etc.

Meanwhile, the information on the cameras 20 listed above may exist in a matched manner on the basis of each camera 20a, 20b, 20c, 20d . . . .

For example, in the storage unit 120, at least one of the identification information, the location information, the angle of view information, the status information, and the image information of the specific camera 20a may be matched with each other to exist as matching information. Such matching information may be useful for specifying a camera at a location for image viewing when the location is later specified.

Next, in the storage unit 120, a map (or map information) for the space 10 may be stored. Here, the map may be configured as at least one of a two-dimensional map and a three-dimensional map. The map for the space 10 may mean a map that may be utilized to determine a current location of the robot (R), or to set the robot's driving path.

In particular, in the robot control system 100 according to at least some example embodiments, the location of the robot (R) may be identified based on images received from the robot (R). To this end, the map for the space 10 stored in the storage unit 120 may consist of data that allows estimation of the location based on images.

Here, the map for the space 10 may be a map prepared in advance based on Simultaneous Localization and Mapping (SLAM) by at least one robot moving in the space 10.

On the other hand, in addition to the types of information listed above, various information may be stored in the storage unit 120.

Next, the display unit 130 may be configured to output images received from at least one of a camera provided at the robot (R) and the cameras placed in the space 10. The display unit 130 is equipped in a device of a manager who manages the robot (R) remotely, and may be installed in a remote control room 100a as shown in FIG. 2. Furthermore, in contrast, the display unit 130 may be or include a display (e.g., a touchscreen) equipped in a mobile device. As such, according to at least some example embodiments, the display unit 130 may be or include any known type of display device.

Next, the input unit 140 is for inputting information from a user (or a manager), which may be a medium between the user (or the manager) and the robot control system 100. More specifically, the input unit 140 may mean an input means of receiving control command from the user to control the robot (R).

Here, there are no specific restrictions on the type of the input unit 140, and the input unit 140 may include at least one of a mechanical input method (or mechanical keys, e.g., a mouse, a joystick, physical buttons, a dome switch, a jog wheel, a jog switch, etc.) and a touch-type input method. For example, the touch-type input method may be a virtual key, a soft key, or a visual key that is displayed on a touchscreen through software processing, or a touch key that is placed outside the touchscreen. Meanwhile, the virtual or visual keys may be displayed on the touchscreen in various forms, for example, graphics, texts, icons, videos, or a combination thereof. Here, when the input unit 140 includes a touch screen, the display unit 130 may be configured as a touch screen. In this instance, the display unit 130 may perform both a role of outputting information and a role of receiving information.

Next, the controller 150 may be configured to control the overall operations of the robot control system 100 related to at least some example embodiments. The controller 150 may process signals, data, information, etc. that are input or output through the components shown above, or provide or process appropriate information or functions to the user.

In particular, the controller 150 may provide a display environment to control the robot (R) using images received from the camera provided at the robot (R) and images received from the cameras 20 placed in the space 10.

The controller 150 may specify at least one camera placed at the location where the robot (R) is located, based on current location information of the robot (R). In particular, it is possible to extract location information where the robot (R) is located in the space from the images received from the camera provided at the robot (R). In addition, the controller 150 may specify the camera corresponding to the location information of the robot (R) extracted from the storage unit 120.

Here, the specified camera may be a camera placed in a location corresponding to the robot's location information. Furthermore, the specified camera may be a camera having an angle of view corresponding to the driving direction of the robot (R).

Meanwhile, as described above, when the camera is specified, the controller 150 may control the display unit 130 to output images received from the robot and images received from the specified camera together. Furthermore, the controller 150 may also perform remote control of the robot (R), based on a user input to the display unit 130 via the input unit 140. For example, the robot (R) may include a controller. The controller of the robot (R) may also be referred to, in the present specification, as the robot controller. The robot controller may be or include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. The processing circuitry of the robot controller may be configured, via hardware and/or software (e.g., firmware), to perform and/or control any operation described in the specification as being performed by a controller, a robot control system (e.g., the delivery system 100), a robot (e.g., robot (R)), or an element of any of the same. The robot controller may also be referred to in the present specification as robot controller circuitry.

Meanwhile, in the above description, an example of estimating the location of the robot (R) by the controller 150 is described, but at least some example embodiments are not limited to this. In other words, location estimation of the robot (R) may be performed by the robot (R) itself. In other words, the robot (R) may estimate its current location in the way as previously described, based on images received from the robot (R) itself. In addition, the robot (R) may transmit the estimated location information to the controller 150. In this case, the controller 150 may perform a series of controls based on the location information received from the robot.

Meanwhile, the image control system 2000 may be configured to control at least one camera 20 placed in the space 10. As shown, multiple cameras 20a, 20b, 20c, 20d, . . . may be placed in the space 10. Such multiple cameras 20a, 20b, 20c, 20d, . . . may be placed at different locations within the space 10.

As such, because the multiple cameras 20a, 20b, 20c, 20d, . . . are disposed at different locations in the space 10, the robot control system 100 may control the robot (R) remotely, using such multiple cameras 20a, 20b, 20c, 20d, . . . .

The image control system 2000 may provide the robot control system 100 with information necessary for control of the robot (R) through mutual communication with the robot control system 100. As previously described in the configuration of the storage unit 120, the storage unit of the image control system 2000 may be configured to store various information about the camera 20. Information about the camera 20 may vary widely, and information about the camera 20 may include i) identification information of each camera 20a, 20b, 20c, 20d . . . (e.g., serial number, TAG information, QR code information, etc.), ii) arrangement location information of each camera 20a, 20b, 20c, 20d . . . (for instance, information on where each camera 20a, 20b, 20c, 20d . . . is disposed in the space, iii)

information on an angle of view of each camera 20a, 20b, 20c, 20d . . . (for instance, information on which view of the space is being captured by each camera 20a, 20b, 20c, 20d . . . ), iv) status information of each camera 20a, 20b, 20c, 20d . . . (for instance, a power state, presence of a malfunction, a battery state, etc.), v) information on images received from each camera 20a, 20b, 20c, 20d . . . , etc.

Meanwhile, the information on the camera 20 listed above may exist in a matched manner on the basis of each camera 20a, 20b, 20c, 20d . . . .

For example, in the storage unit of the image control system 2000, at least one of the identification information, the location information, the angle of view information, the status information, and the image information of the specific camera 20a may be matched with each other to exist as matching information. Such matching information may be useful for specifying a camera placed at a location for image viewing when the location is later specified.

The following descriptions illustrate that the aforementioned information from the cameras is stored in the storage unit 120 for convenience of explanations, regardless of which storage unit (or storage place). In other words, information about the cameras may be stored in a variety of storage units, depending on the circumstances, so at least some example embodiments do not impose any special restrictions on them.

Meanwhile, according to the above description, according to at least some example embodiments, the image control system 2000 and the robot control system 100 are described to have separate configurations. However, at least some example embodiments are not limited to this, and the image control system 2000 and the robot control system 100 may be configured as a single integrated system. In this case, the image control system 2000 may also be referred to as a "camera part".

Figure 3:
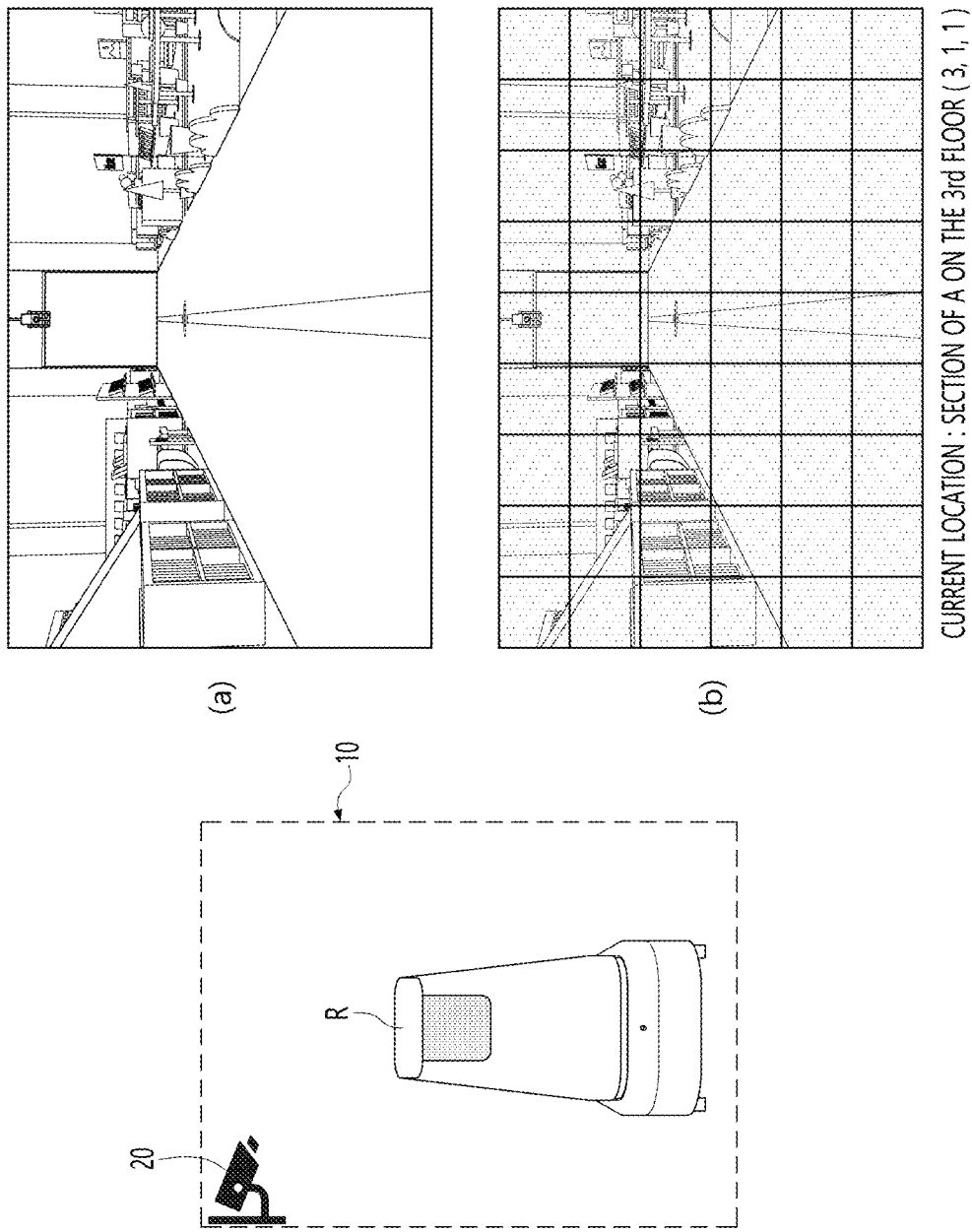
FIG. 3 is a conceptual view illustrating images collected by a robot and a method to estimate a current location of the robot in a robot control method and system according to at least some example embodiments.

Below, descriptions will be more specifically given of a method to estimate a current location of the robot (R) based on images received from the robot (R) with the accompanying drawings. FIG. 3 is a conceptual view illustrating images collected from the robot and a method to estimate the current location of the robot.

As described above, the controller 150 according to at least some example embodiments may be configured to, using the camera (not shown) provided at the robot (R), receive images about the space 10 and to perform Visual Localization to estimate the robot's location from the received images. Here, the camera provided at the robot (R) may be configured to capture (or sense) images about the space 10, i.e., images around the robot (R). Hereinafter, for convenience of explanations, images acquired by the camera provided at the robot (R) will be referred to as "robot images". In addition, images acquired through the cameras placed in the space 10 are referred to as "space images".

The controller 150 may be configured to acquire a robot image through the camera provided at the robot (R) as shown in item (a) of FIG. 3. In addition, the controller 150 may estimate the current location of the robot (R), using the acquired robot image.

The controller 150 may compare the robot image with the map information stored in the storage unit 120 to extract location information (e.g., "section A on the 3$^{rd}$ floor (3, 1, 1)") corresponding to the current location of the robot (R) as shown in item (b) of FIG. 3.

As described above, the map for the space 10, according to at least some example embodiments, may be a map prepared in advance based on Simultaneous Localization and Mapping (SLAM) by at least one robot moving in the space 10. Specifically, the map for the space 10 may be a map generated based on image information.

In other words, the map for the space 10 may be a map generated by a vision (or visual)-based SLAM technology.

Thus, the controller 150 may specify coordinate information (e.g., section A (3, 1, 1)) for the robot image acquired from the robot (R), as shown in item (b) of FIG. 3. As such, specific coordinate information may, namely, become the current location information of the robot (R).

Here, the controller 150 may estimate the current location of the robot (R) by comparing the robot image acquired from the robot (R) with the map generated by the vision (or visual) based SLAM technology. In this case, the controller 150 may i) specify an image most similar to the robot image by using image comparison between the robot image and the images that constitute the pre-generated map, and ii) specify the location information of the robot (R) by acquiring location information that is matched with the specified image.

As such, the controller 150 may specify the current location of the robot, using the acquired robot image when the robot image is acquired from the robot (R), as shown in Item (a) of FIG. 3. As described above, the controller 150 may extract location information (e.g., coordinate information) corresponding to the robot image, from the map information stored in the storage unit 120 (e.g., may also be referred to as "reference map").

Meanwhile, in the above descriptions, was explained an example of estimating the location of the robot (R) by the controller 150, but as described earlier, localization of the robot (R) may be performed by the robot itself. In other words, the robot (R) may estimate its current location in the way as described above, based on images received from the robot itself 100. In addition, the robot (R) may transmit the estimated location information to the controller 150. In this case, the controller 150 may perform a series of controls based on the location information received from the robot.

As such, when the location information of the robot (R) is extracted from the robot image, the controller 150 may specify at least one camera 20 placed at a location corresponding to the above location information. The controller 150 may specify the camera 20 placed at the location corresponding to the above location information, from matching information related to the cameras stored in the storage unit 120.

In addition, for control of the robot (R), the controller 150 may output the robot image acquired from the robot (R) itself, as well as images acquired from the camera 20 placed in the space where the robot (R) is located, to the display unit 130.

Figure 4:
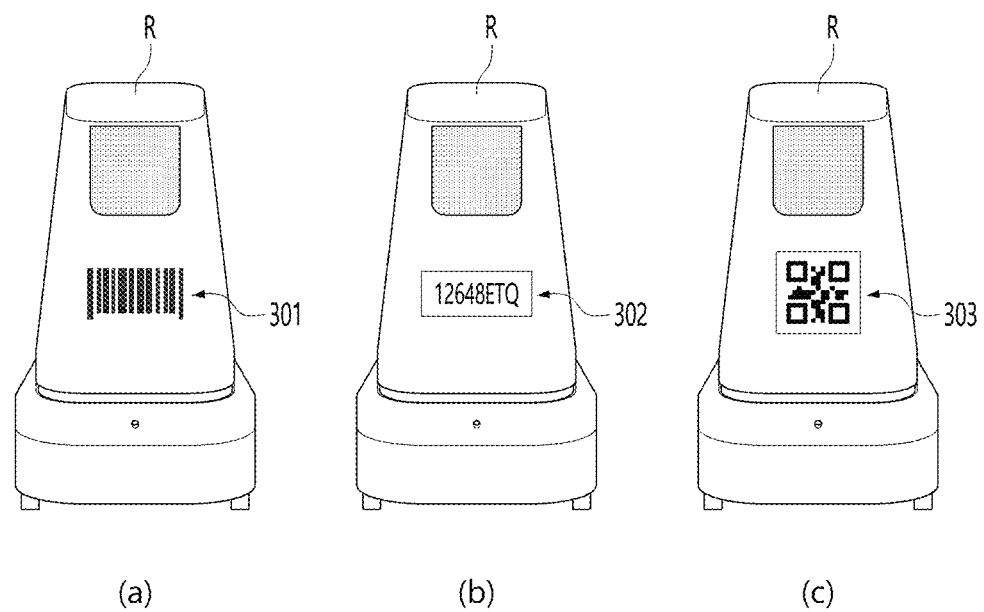
FIG. 4 is a conceptual view for explaining a method to identify a robot in a robot control method and system according to at least some example embodiments.

As shown in FIG. 4, identification information of the robot (R) may be extracted from an image, based on an identification sign (or an identification mark) provided at the robot (R). As shown in items (a), (b) and (c) of FIG. 4, identification marks 301, 302, 303 of the robot (R) may include identification information of the robot. As shown, the identification marks 301, 302, 303 may be represented as a barcode 301, series information (or serial information) 302, and a QR code 303. Each of the barcode 301, the series information (or serial information) 302 and the QR code 303 may be configured to include identification information of the robot.

The identification information of the robot is information for discerning each robot. And even the same type of robots may have different identification information. The information which constitutes the identification marks may include various configurations as well as the aforementioned barcode, series information and QR code.

The controller 150 may extract identification information of the robot (R) from an image received from the camera 20 based on the aforementioned identification mark, thereby specifying the robot (R) captured by the camera 20, and checking a location of the specified robot (R) in the space 10.

According to at least some example embodiments, methods to specify the robot (R) captured by the camera 20 may be variable. As aforementioned, the controller 150 can specify the robot (R) by extracting identification information of the robot (R) from an image. Besides, the controller 150 can specify a current location of the robot (R) captured by the camera 20, by using at least one of an image-captured time, and location information matched with the camera 20 which has captured an image.

According to at least some example embodiments, methods to specify the robot (R) captured by the camera 20 may be variable. As aforementioned, the controller 150 can specify the robot (R) by extracting identification information of the robot (R) from an image. Besides, the controller 150 can specify a current location of the robot (R) captured by the camera 20, by using at least one of an image-captured time, location information matched with the camera 20 which has captured an image, and location information of the robot (R).

The controller 150 may specify the robot (R) which has been positioned at a region corresponding to an angle of view of the camera 20 which has captured an image, at an image-captured time, by using the location information of the robot (R). Here, the location information of the robot (R) may be received from the robot (R) or may be acquired by the controller 150. Here, the location information of the robot (R) may include information on an absolute location of the robot (R).

The location information of the robot (R) may be acquired based on an image. More specifically, the robot (R) may be configured to receive images about the space 10 by using the camera (not shown) provided at the robot (R), and to perform Visual Localization to estimate the location of the robot from the received images. Here, the camera provided at the robot (R) may be configured to capture (or sense) images about the space 10, i.e., images around the robot (R).

The robot (R) or the controller 150 may compare the image captured by the robot (R) with map information stored in the storage unit 120, thereby extracting position information corresponding to a current location of the robot (R).

As aforementioned, according to at least some example embodiments, the map for the space 10 may be a map preset based on Simultaneous Localization and Mapping (SLAM) by at least one robot moving in the space 10. Specifically, the map for the space 10 may be a map generated based on image information.

Once the position information of the robot (R) is extracted from the robot (R) or the controller 150, the controller 150 may specify the robot captured by the camera 20 based on the position information.

Identification information of the robot (R), position information of the robot (R), and time information on a time when the robot (R) has been disposed at a corresponding location may be stored in the storage unit 120 in a matching manner. Such matching information may exist at each robot (R) separately, and may be referred to as a time stamp.

The controller 150 may specify the robot captured by the camera 20 based on i) a time when an image of the robot (R) has been captured by the camera 20 and position information of the camera 20, and ii) a time stamp of the robot (R) stored in the storage unit 120.

Like this, the identification information of the robot may be extracted (or specified) by using position information of the robot and position information of the camera 20.

At least some example embodiments may provide a robot control method and system capable of allowing a manager to pre-recognize a dangerous situation which may occur with respect to driving of the robot, by together outputting an image about a space where the robot drives and a graphic object which has reflected driving information of the robot, to the display unit 130.

Here, the dangerous situation may mean a situation where a safety accident may occur with respect to the robot. For instance, the dangerous situation may mean a situation where the robot collides with an object positioned in the space.

Here, the object may mean at least one of a static object and a dynamic object.

More specifically, the static object may mean, for example, at least one of a thing arranged in the space (e.g., a table, a sofa, a sign, a mannequin, etc.) and a structure which forms the space (e.g., stairs, a wall, etc.).

And the dynamic object may mean, for example, at least one of a pedestrian (or a person), an animal (e.g., a dog, a cat, etc.) and another robot.

The controller 130 of the robot control system 100 according to at least some example embodiments may display a graphic object according to driving information of the robot, to an image received from the robot or the camera provided in the space, in an overlapped manner.

Thus, a manager who remotely manages driving of the robot may remotely manage the robot based on such information, in order to prevent a dangerous situation.

Figure 5:
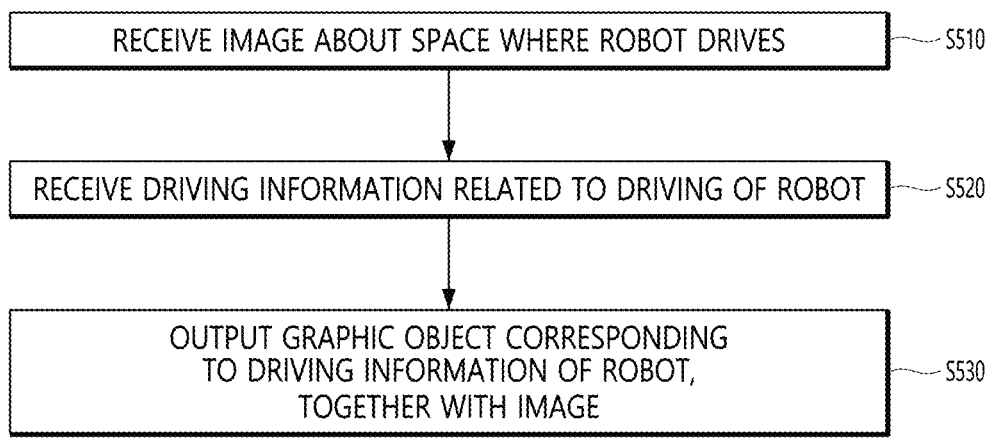
FIG. 5 is a flowchart for explaining a robot control system according to at least some example embodiments.
Figure 6A:
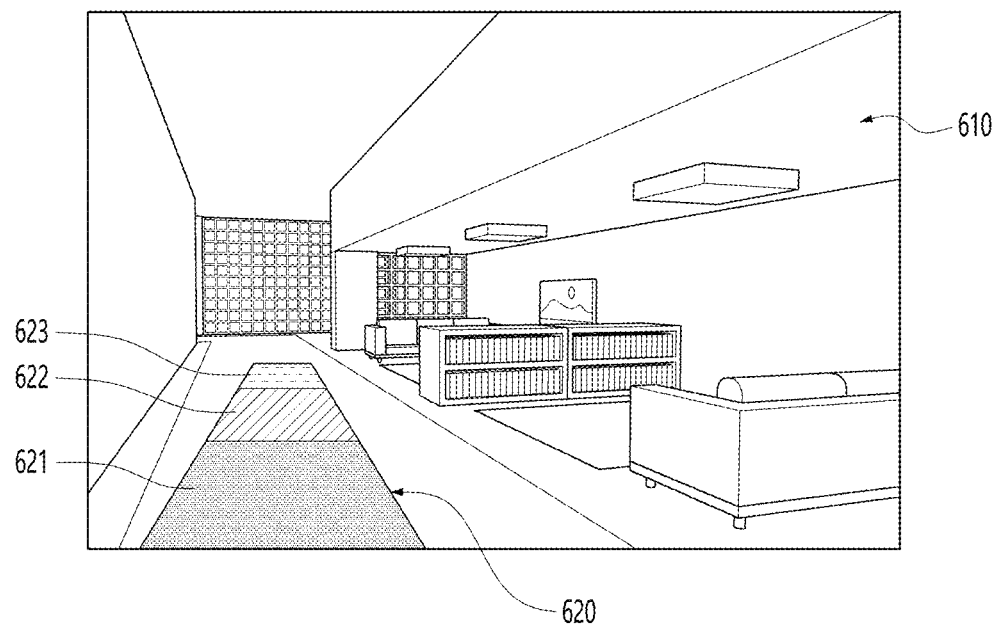
FIGS. 6A to 6C are conceptual views for explaining a method to output a graphic object related to driving of a robot.
Figure 6B:
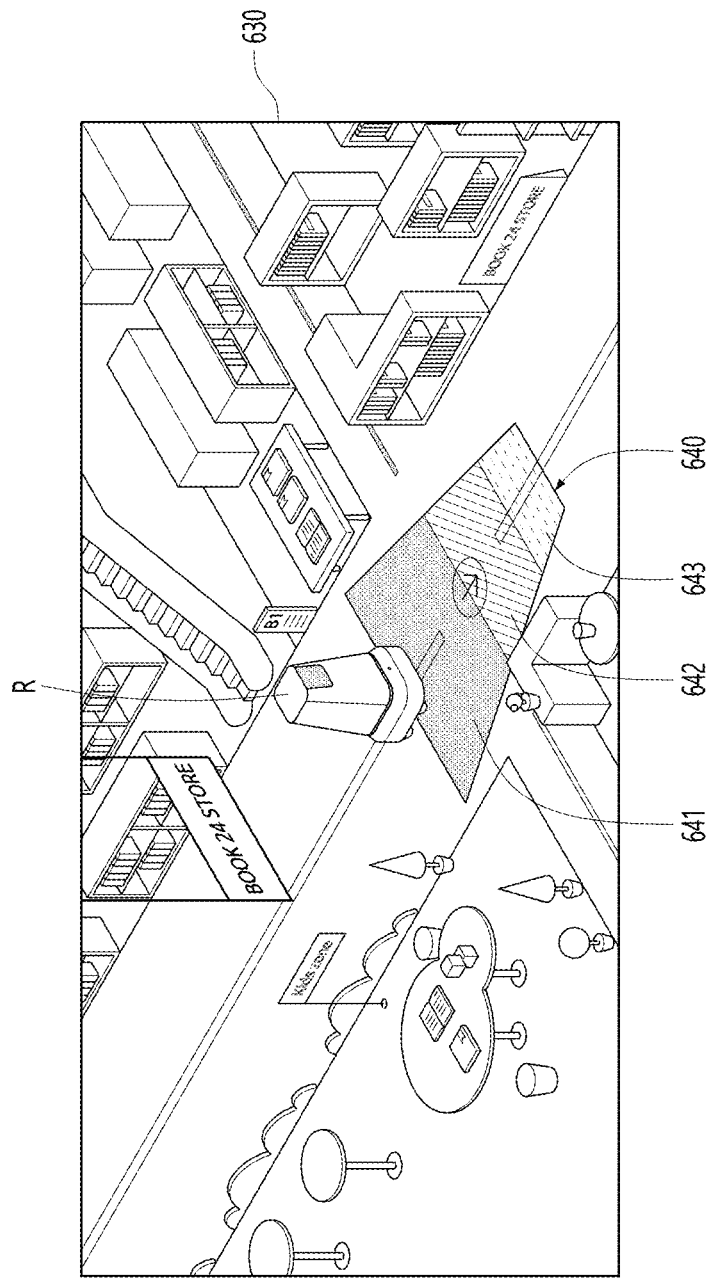
Figure 6C:
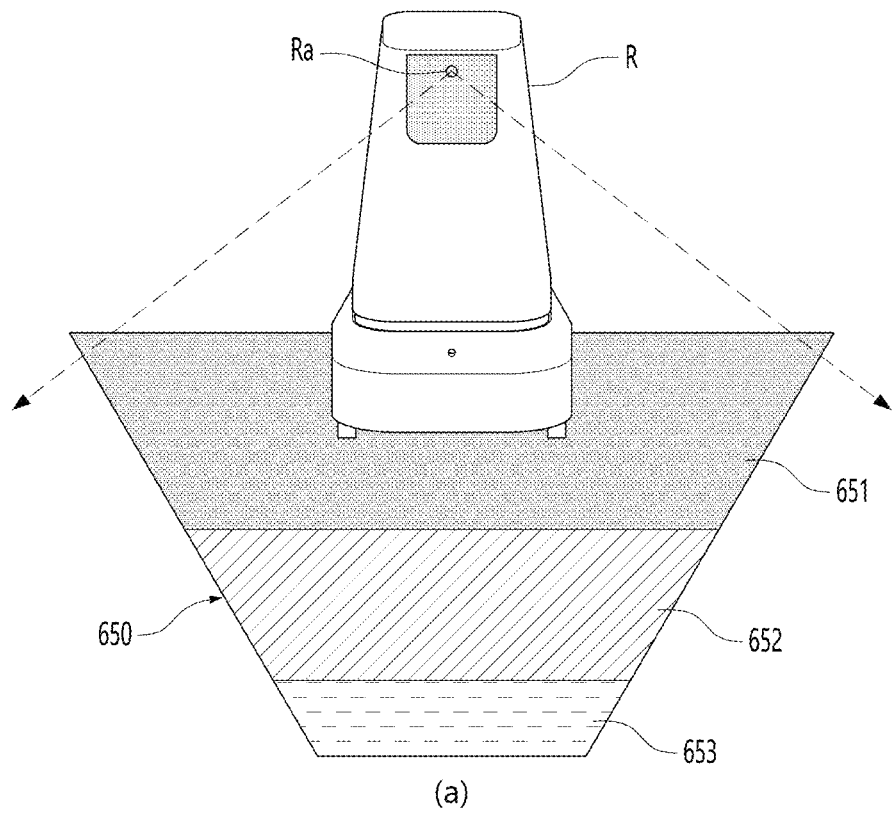
Figure 6C:
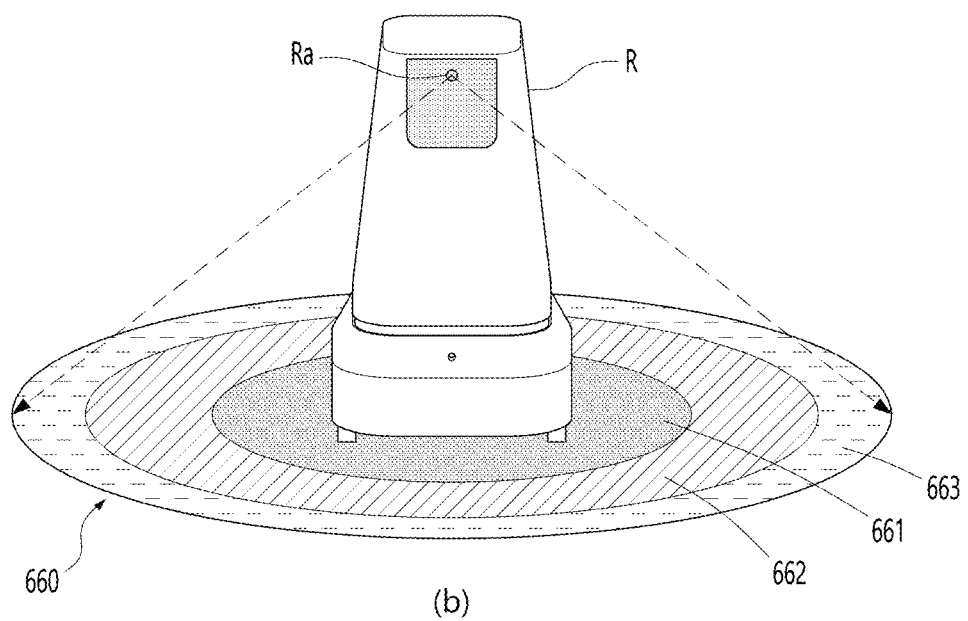

Hereinafter, a robot control method and system according to at least some example embodiments will be explained in more detail with reference to the attached drawings. FIG. 5 is a flowchart for explaining a robot control system according to at least some example embodiments, and FIGS. 6A to 6C are conceptual views for explaining a method to output a graphic object related to driving of the robot. FIGS. 7A to 7F are conceptual views for explaining a method to control a visual characteristic of a graphic object based on driving information of the robot. And FIG. 8 is a conceptual view for explaining a method to provide a guide message related to driving of the robot.

In the robot control method according to at least some example embodiments, firstly, an image about a space where the robot drives is received (S510).

Here, a subject to provide the image may be variable.

For instance, the image may be captured by the camera provided at the robot, and may be provided from the robot. The controller 150 may receive the image from the robot through the communication unit 110.

As another example, the image may be captured by the camera provided in the space (e.g., CCTV), and may be provided from the camera provided in the space. In this case, the image may be provided to the robot control system 100 according to at least some example embodiments, from the aforementioned image control system 2000. The controller 150 may receive the image from the image control system 2000 through the communication unit 110.

The image about the space where the robot drives may be an image received from a camera having a space corresponding to a driving direction of the robot as an angle of view. In this case, as shown in FIG. 6A, an image 610 may be an image having the robot as a first-person view (perspective). In this case, according to at least some example embodiments, the image 610 may be referred to as a "first-person view image".

For instance, as shown in FIG. 6A, the first-person view image 610, which is about a space where the robot drives, may be an image that corresponds to a space towards which the robot faces, in a driving direction of the robot, by having the robot as a first-person view.

In this case, the first-person view image 610 may be an image received from the robot. Under an assumption that the robot drives on the basis of the front side, the first-person view image 610 may be received from a camera provided on a front surface of the robot.

As shown in FIG. 6B, an image corresponding to a space where the robot drives may be an image 630 having the robot as a third-person view. In this case, according to at least some example embodiments, the image 630 may be referred to as a "third-person view image".

The third-person view image 630 may be an image received from a camera provided in the space (e.g., a CCTV). The third-person view image 630 is an image obtained by capturing the robot which drives in the space as a subject. As shown in FIG. 6B, the third-person view image 630 may include a robot image (or a subject image) (R) corresponding to the captured robot.

In the robot control method according to at least some example embodiments, driving information related to driving of the robot is received (S520).

More specifically, the driving information related to driving of the robot may include at least one information related to driving of the robot, such as a driving speed of the robot, a driving direction, a rotation direction, a rotation speed, a driving start, a driving stop and a driving termination.

The driving information may be received from the robot. The controller 150 may receive driving information of the robot from the robot which is moving in the space, through the communication unit 110, real time or at preset time intervals.

The driving information of the robot may be acquired by various methods rather than the method to receive from the robot.

For instance, the controller 150 may acquire driving information of the robot by a computation according to a preset algorithm. More specifically, the controller 150 may calculate a driving speed of the robot by using a position change (displacement) of the robot. In this case, the controller 150 may sense the robot by using an image received from the camera arranged in the space, and may calculate a driving speed of the robot based on a displacement of the sensed robot.

According to at least some example embodiments, if the image about the space where the robot drives and the driving information related to driving of the robot are received, the received image is output to the display unit together a graphic object corresponding to the driving information of the robot (S530).

Here, there is no restriction on the types of the display unit to output the image and the graphic object. For instance, the display unit is equipped in a device of a manager who manages the robot (R) remotely, and may be installed in a remote control room 100a, as shown in FIG. 2. Alternatively, the display unit may be a display equipped in a mobile device.

The controller 150 may control the display to display the graphic object on the received image in an overlapped manner. According to at least some example embodiments, the graphic object may be, for example, a visual indicator that may be, for example, provided on a display. As shown in FIGS. 6A and 6B, graphic objects 620, 640 may be overlapped with received images 610, 630.

Here, areas that the graphic objects 620, 640 occupy on the received images 610, 630 may be determined by considering a distance from the robot and a magnification of the images. According to at least some example embodiments, the graphic object serves to allow a manager or a pedestrian to recognize a dangerous situation which may occur due to driving of the robot. Thus, the graphic object should reflect information on a substantial space where a dangerous situation may occur due to the robot. The controller 150 may determine a size of the graphic object such that a substantial distance from the robot is reflected, at the time of overlapping the graphic object with the image.

The storage unit 120 may store therein information on an area (or a size) of a dangerous region, based on driving information of the robot (e.g., a driving speed). For instance, the storage unit 120 may include therein attribute information about an attribute of a dangerous region set based on a driving speed of the robot. The attribute information may include at least one of radius information of the dangerous region, a shape of the dangerous region, a horizontal length of the dangerous region, and a vertical length of the dangerous region.

The controller 150 may determine an output size of the graphic object in correspondence to a substantial size of the dangerous region, by referring to such attribute information.

The images 610, 630 are images obtained by capturing a space including the robot, and have a magnification to reduce the size of the space by a predetermined or, alternatively, desired ratio. Thus, the controller may also determine an output size of the graphic object, by reducing an area of the dangerous region with the same magnification as the image reduction magnification.

Hereinafter, examples to output graphic objects will be explained.

For instance, as shown in FIG. 6A, the controller 150 may output the graphic object 620 to the first-person view image 610 in an overlapped manner.

As another example, as shown in FIG. 6B, the controller 150 may output the graphic object 640 to the third-person view image 630 in an overlapped manner.

Besides, the controller 150 may transmit, to the robot (R), data corresponding to the graphic object having a visual characteristic according to driving information of the robot. The controller 150 may generate image data corresponding to the graphic object which has reflected a visual characteristic according to driving information. Then, the controller 150 may transmit the generated image data to the robot (R) through the communication unit 110. The robot (R) may output a graphic object based on the received image data. Further, the robot itself can generate a graphic object. In this case, a method to be explained later may be equally applied to the graphic object generation method.

As shown in FIG. 6C, items (a) and (b), the robot (R) may output graphic objects 650, 660 therearound by using the output unit. Here, the output unit may have any type only if it outputs visual information towards the space, and there are no restrictions on an arrangement position and a type of the output unit. For instance, the output unit may be configured as a light-emitting diode (LED) or a projector, etc.

As shown in FIGS. 6A, 6B and 6C, the graphic objects 620, 640, 650, 660 may include a plurality of regions 621, 622, 623, 641, 642, 643, 651, 652, 653, 661, 662, 663 sequentially arranged in one direction. In a case that the graphic objects are output by the display unit or the robot, the one direction may correspond to a driving direction of the robot (R).

For instance, as shown in FIG. 6A, the first-person view image 610 is an image which faces a driving direction of the robot. Thus, in this case, the graphic object may include a plurality of regions 621, 622, 623 sequentially arranged along one direction corresponding to the driving direction of the robot.

Here, the image outputted to the display unit corresponds to an image which faces a space along a driving direction of the robot. Thus, a position in the space corresponding to a portion of the image outputted to a lower part of the display unit may be closer to the robot than a position in the space corresponding to a portion of the image outputted to an upper part of the display unit.

Thus, as shown in FIG. 6A, a portion of the image 610, overlapped with the first region 621 outputted to the lower side of the display unit in a nearest manner, among the plurality of regions 621, 622, 623 may be a space relatively nearest to the robot, among the substantial space corresponding to the image 610.

As another example, as shown in FIG. 6B, the third-person view image 630 may include a robot image (or a subject image) (R) corresponding to the robot, and a graphic object 640 arranged towards a driving direction of the robot. In this case, the graphic object 640 may also include a plurality of regions 641, 642, 643 sequentially arranged along one direction corresponding to the driving direction of the robot.

As still another example, as shown in FIG. 6C, in a case that the robot directly outputs a graphic object 650, the robot may output the graphic object 650 towards a driving direction as shown in FIG. 6C, item (a). As shown, the graphic object 650 may include a plurality of regions 651, 652, 653 sequentially arranged along one direction corresponding to the driving direction of the robot. If the driving direction of the robot is changed, the output position of the graphic object may be also changed. For instance, if the robot drives towards a front direction, the graphic object may be output to a first space which is towards a front direction of the robot. On the other hand, if the robot drives towards a rear direction (e.g., a backward movement), the graphic object may be output to a second space opposite to the first space.

Further, as shown in item (b) of FIG. 6C, the robot may output the graphic object to a surrounding region of the robot, as well as the driving direction. As shown, the graphic object 650 may be output within a range of 360° on the basis of the robot. In this case, the graphic object 650 may also include a plurality of regions 661, 662, 663 sequentially arranged along one direction corresponding to the driving direction of the robot.

According to at least some example embodiments, the graphic objects for notifying a dangerous situation may have visual characteristics which are changeable according to driving information of the robot.

As aforementioned, the dangerous situation may mean a situation where a safety accident may occur with respect to the robot. For instance, the dangerous situation may mean a situation where the robot collides with an object positioned in the space (at least one of a static object and a dynamic object).

The controller 150 may set a region having a high possibility of danger occurrence by the robot as a dangerous region, in a driving space of the robot, based on driving information of the robot. And the controller 150 may set a region having a relatively lower possibility of danger occurrence than the dangerous region, as a safe region. Further, at least one intermediate region may exist between the dangerous region and the safe region. According to at least some example embodiments, the graphic objects which have reflected such driving information with a visual characteristic may be output in the manners shown in FIGS. 6A to 6C.

Hereinafter, will be explained in more detail with reference to FIGS. 7A to 7E, a method to determine a visual characteristic of a graphic object based on driving information of the robot, regardless of whether the graphic object is being output to which type of view image, or regardless of whether the graphic object has been output by which subject.

The controller 150 may intuitively provide information on a dangerous situation which may occur due to driving of the robot, to a manager who controls the robot, by displaying information on a dangerous region and a safe region on the display unit through a graphic object. Further, as shown in FIG. 6C, in a case that the robot directly displays the graphic object, a pedestrian (or a user) positioned near the robot may recognize such a graphic object, and may intuitively check information on a dangerous situation which may occur from the robot.

According to at least some example embodiments, the controller 150 may output information on a dangerous situation by controlling a visual characteristic of a graphic object, based on driving information of the robot.

Here, the dangerous situation which may occur from the robot may be determined based on driving information of the robot. For instance, when a driving speed of the robot is high, a collision risk with a pedestrian may be higher than in a case when a driving speed of the robot is low. Thus, according to at least some example embodiments, the controller 150 may determine a visual characteristic of the graphic object, based on driving information of the robot. The visual characteristic of the graphic object may be defined by various visual factors (or features). For instance, visual factors to determine a visual characteristic of a graphic object may include i) a size ratio among a plurality of regions within a graphic object (or an area occupied by each of a plurality of regions), ii) a color of each of a plurality of regions which constitute a graphic object, iii) a vertical length of a graphic object, iv) a horizontal length of a graphic object (a width or a breadth), etc.

The controller 150 may reflect a dangerous situation by the robot by using at least one of the above-mentioned visual factors.

For instance, the controller 150 may differently display a degree of a dangerous situation by differently setting a ratio among a plurality of regions. As another example, the controller 150 may differently display information on a dangerous situation by differently setting colors of a plurality of regions.

Figure 7A:
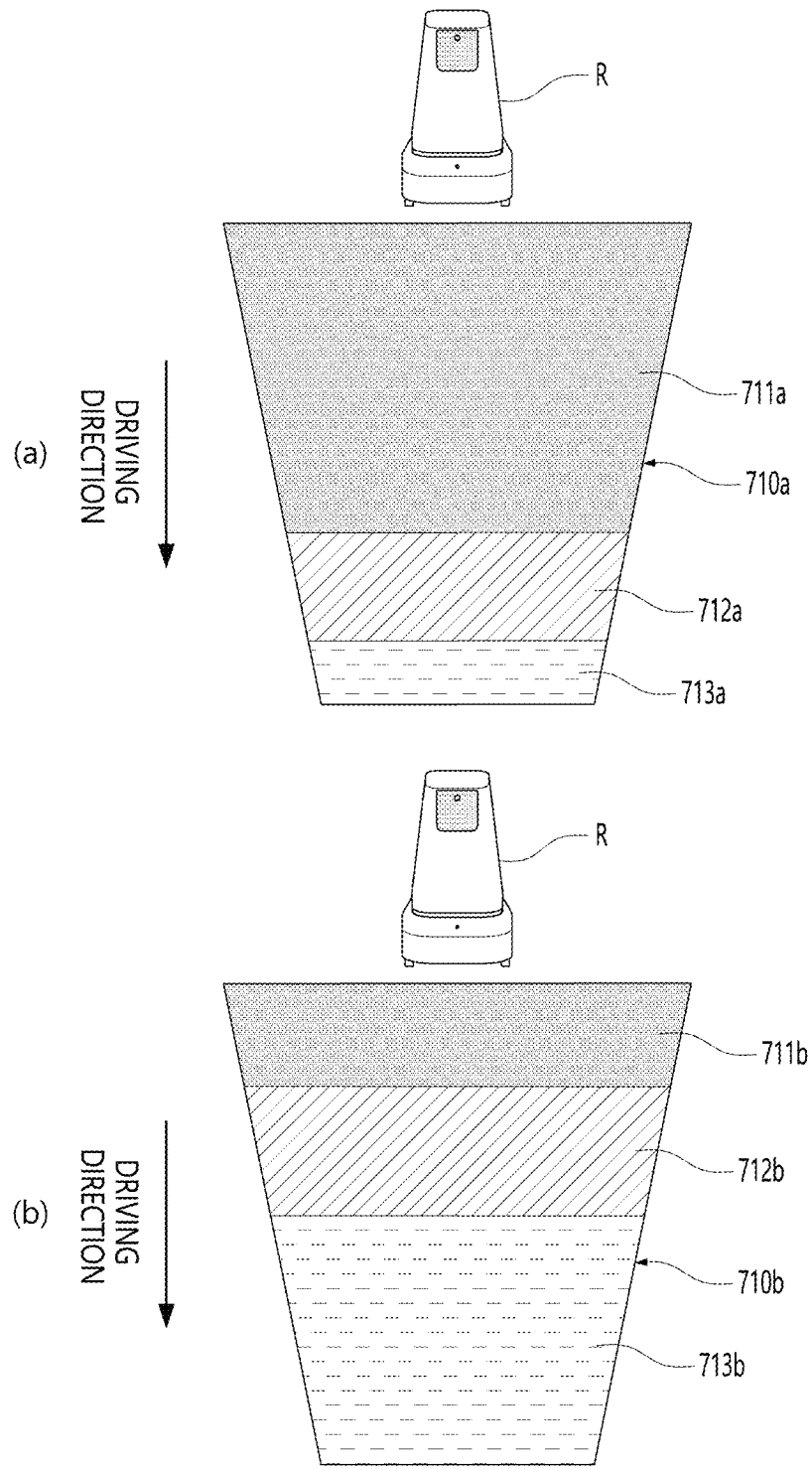
FIGS. 7A to 7F are conceptual views for explaining a method to control a visual characteristic of a graphic object based on driving information of a robot.
Figure 7B:
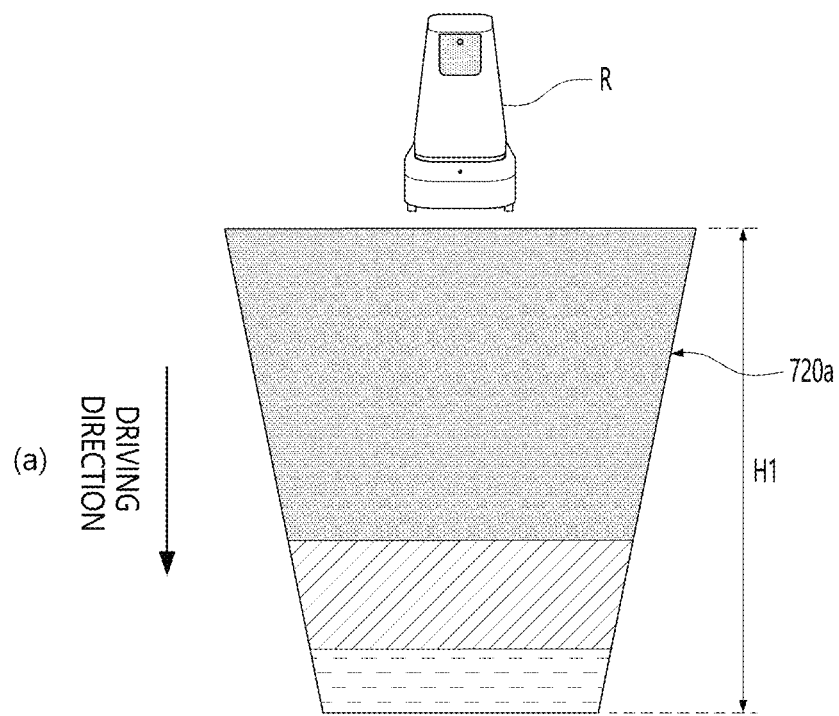
Figure 7B:
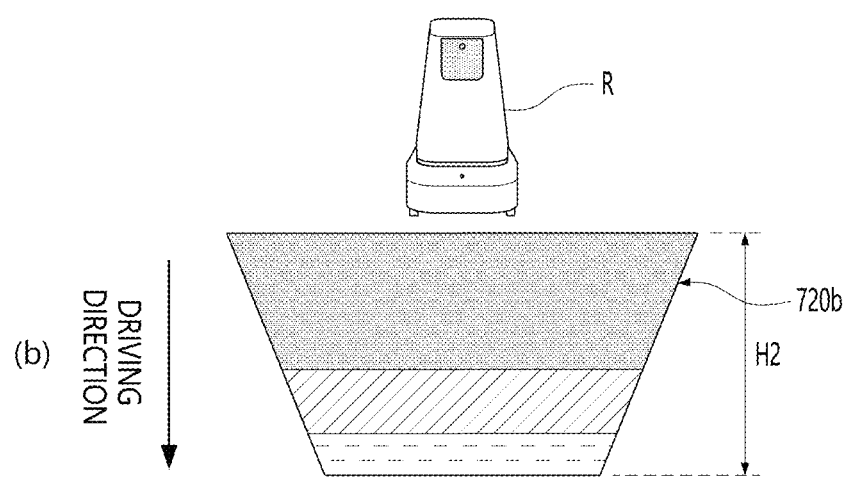
Figure 8:
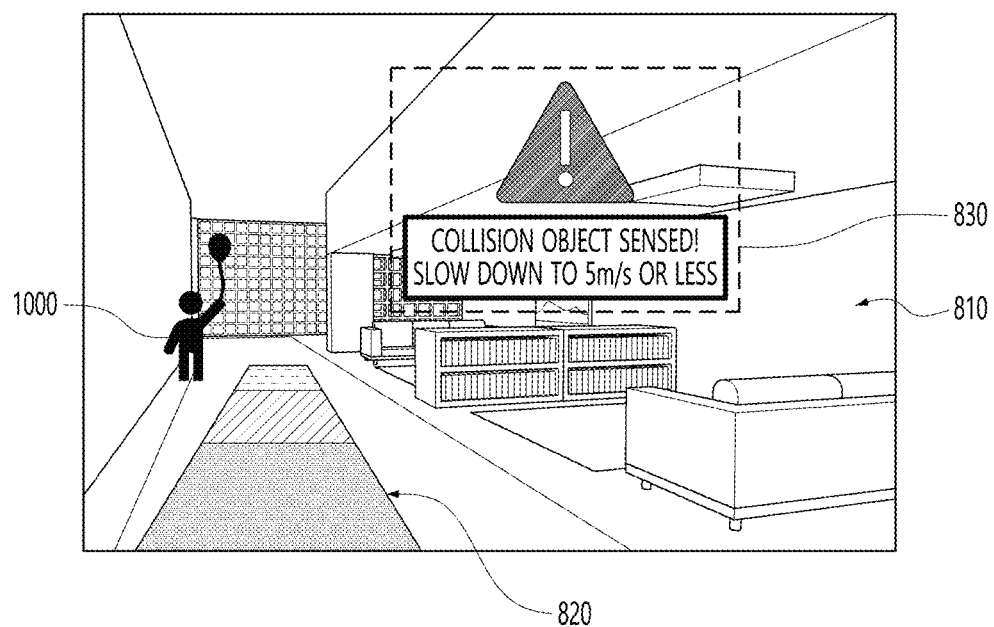
FIG. 8 is a conceptual view for explaining a method to provide a guide message related to driving of a robot.

More specifically, as shown in FIGS. 7A and 7B, graphic objects 710a, 710b may include a plurality of regions 711a, 712a, 713a, 711b, 712b, 713b sequentially arranged in one direction. In a case that the graphic objects are output by the display unit or the robot, the one direction may correspond to a driving direction of the robot (R).

According to at least some example embodiments, each of the plurality of regions 711a, 712a, 713a, 711b, 712b, 713b included in the graphic objects 710a, 710b may correspond to a different risk level related to driving of the robot. And the plurality of regions 711a, 712a, 713a, 711b, 712b, 713b may be arranged in the graphic objects 710a, 710b towards a gradually-distant direction, from a high risk level to a low risk level. Here, the "gradually-distant direction from a high risk level to a low risk level" may be a driving direction of the robot. And the "gradually-distant direction from a high risk level to a low risk level" may correspond to a direction which becomes gradually far from the robot in the space.

The controller 150 may be matched a first level having a highest risk among the different risk levels, with the first regions 711a, 711b nearest to the robot among the plurality of regions 711a, 712a, 713a, 711b, 712b, 713b. Here, the region nearest to the robot in FIG. 6A may be the region 621 arranged to be nearest to the lower side of the display unit.

The controller 150 may be matched a second level having a lowest risk among the different risk levels, with the second regions 713a, 713b farthest from the robot among the plurality of regions 711a, 712a, 713a, 711b, 712b, 713b. Here, the region farthest from the robot in FIG. 6A may be the region 623 arranged to be nearest to the upper side of the display unit.

The controller 150 may control an area (or a ratio) of each of the plurality of regions 711a, 712a, 713a, 711b, 712b, 713b in the graphic objects 710a, 710b, based on driving information of the robot.

As aforementioned, the driving information includes a driving speed of the robot. And the controller 150 may control an area (or a ratio) of each of the plurality of regions 711a, 712a, 713a, 711b, 712b, 713b in the graphic objects 710a, 710b, based on driving information of the robot.

As a driving speed of the robot is increased (or as the robot drives rapidly), the controller 150 may generate data corresponding to the graphic objects, such that the first regions 711a, 711b overlapped with the regions closest to the robot have a large size. Here, the first regions 711a, 711b may correspond to regions matched with the first level having a highest risk. Thus, as a driving speed of the robot is increased (or as the robot drives rapidly), the controller 150 may control the display unit such that the first regions 711a, 711b have a large size, or may generate data corresponding thereto. As aforementioned, in an image, an overlapped region of a graphic object may be a region corresponding to a substantial space.

Like this, as the driving speed of the robot is increased, an area of the first region among the graphic object may be relatively larger than an area of the second region. The driving speed of the robot of item (a) of FIG. 7A may be higher than that of the robot of item (b) of FIG. 7A. In this case, the controller 150 may control the display unit such that an area of the first region 711a of item (a) of FIG. 7A among the graphic object is larger than an area of the first region 711b of item (b) of FIG. 7A, or may generate relevant date.

Accordingly, as the driving speed of the robot is decreased, as shown in FIG. 7A, areas of the first regions 711a, 711b in the graphic objects 710a, 710b may be relatively smaller than areas of the second regions 713a, 713b. In a case that the robot stops, an output side of the graphic object may be the smallest.

In the storage unit 120, information on a ratio of an area of each region in the graphic object according to a driving speed of the robot may be stored.

The controller 150 may determine an area of each region in the graphic object, based on a current driving speed of the robot and information stored in the storage unit 120.

Even if the graphic object has the same output size, the controller 150 may provide information on a risk degree according to driving of the robot to a manager or a pedestrian, by differently controlling areas of a plurality of regions in the graphic object.

The controller 150 may display each of a plurality of regions which constitute the graphic object in a different color. The controller 150 may provide information on a most dangerous region to a manager or a pedestrian, by controlling the display unit to display each of a plurality of regions in a different color.

Accordingly, as shown in FIG. 7A, the first regions 711a, 711b having a highest risk level and the second regions 713a, 713b having a lowest risk level may be displayed in different colors.

The aforementioned visual characteristic of the graphic object may be changed real time or at preset time intervals as driving information of the robot is changed. Thus, in a case that a driving speed of the robot is changed while the robot is driving, the aforementioned areas of the plurality of regions may be also changed according to the driving speed of the robot.

As aforementioned, an area that a graphic object occupies on an image may be determined by considering a distance from the robot and a magnification of the image. According to at least some example embodiments, the graphic object serves to allow a manager or a pedestrian to recognize a dangerous situation which may occur due to driving of the robot. Thus, the graphic object should reflect information on a substantial space where a dangerous situation may occur due to the robot. The controller 150 may determine a size of the graphic object such that a substantial distance from the robot is reflected, at the time of overlapping the graphic object with an image.

The storage unit 120 may store therein information on an area (or a size) of a dangerous region, based on driving information of the robot (e.g., a driving speed). For instance, the storage unit 120 may include therein attribute information about an attribute of a dangerous region set based on a driving speed of the robot. The attribute information may include at least one of radius information of the dangerous region, a shape of the dangerous region, a horizontal length of the dangerous region, and a vertical length of the dangerous region.

The controller 150 may determine an output size of the graphic object in correspondence to a substantial size of the dangerous region, by referring to such attribute information.

Meanwhile, an image is obtained by capturing a space including the robot, and has a magnification to reduce the size of the space by a predetermined or, alternatively, desired ratio. Thus, the controller 150 may also determine an output size of the graphic object, by reducing an area of the dangerous region with the same magnification as the image reduction magnification.

The controller 150 may determine an output size of the graphic object based on driving information of the robot (e.g., a driving speed). As aforementioned, the controller 150 may determine an output size of the graphic object by referring to attribute information stored in the storage unit 120. Thus, at least one of a length and a width of the graphic object may be changed based on a driving speed of the robot.

For instance, as shown in FIG. 7B, the controller 150 may differently control lengths (H1, H2) of graphic objects based on a driving speed of the robot. When the driving speed of the robot is high (or the robot drives rapidly), a dangerous region needs to be set to be larger than that in a case that the driving speed of the robot is low (or the robot drives slowly), because a displacement of the robot is large.

As shown in items (a) and (b) of FIG. 7B, the controller 150 may differently set the lengths of the graphic objects 720a, 720b according to a driving speed of the robot. Thus, the graphic objects 720a, 720b having different lengths may be output to the display unit or the robot according to a driving speed of the robot.

In this case, a ratio of a plurality of regions included in the graphic object may be also controlled in the manner aforementioned with reference to FIG. 7A.

Figure 7C:
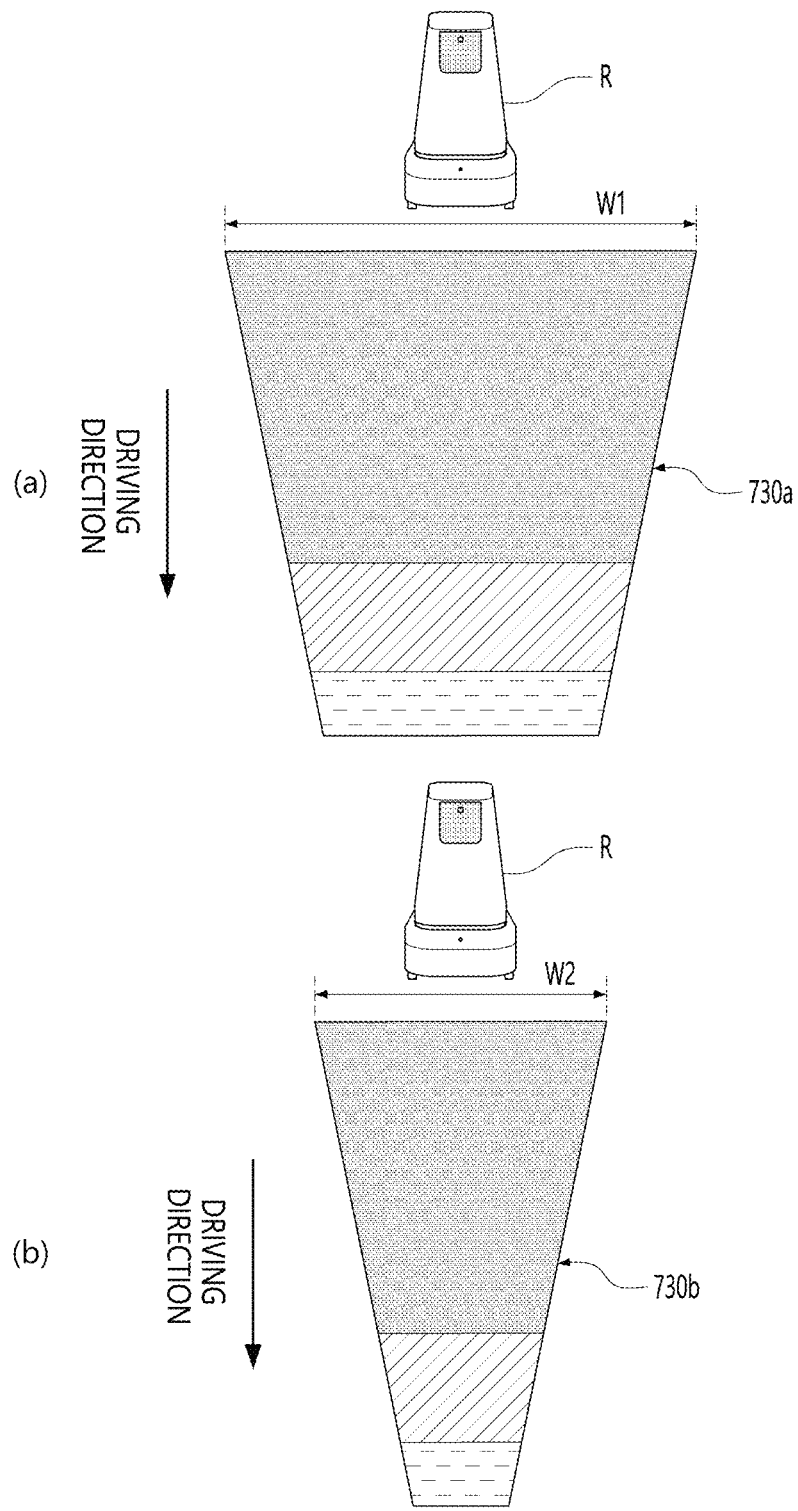

As another example, as shown in FIG. 7C, the controller 150 may differently control widths (W1, W2) of graphic objects based on a driving speed of the robot. When the driving speed of the robot is high (or the robot drives rapidly), there is a need to be careful of access to the space. Thus, when the driving speed of the robot is high, a dangerous region should be set to be large.

Accordingly, as shown in items (a) and (b) of FIG. 7C, the controller 150 may differently control the widths of the graphic objects 730a, 730b based on a driving speed of the robot. Thus, the graphic objects 730a, 730b having different widths may be output to the display unit or the robot according to a driving speed of the robot.

In this case, a ratio of a plurality of regions included in the graphic object may be also controlled in the manner aforementioned with reference to FIG. 7A.

Figure 7D:
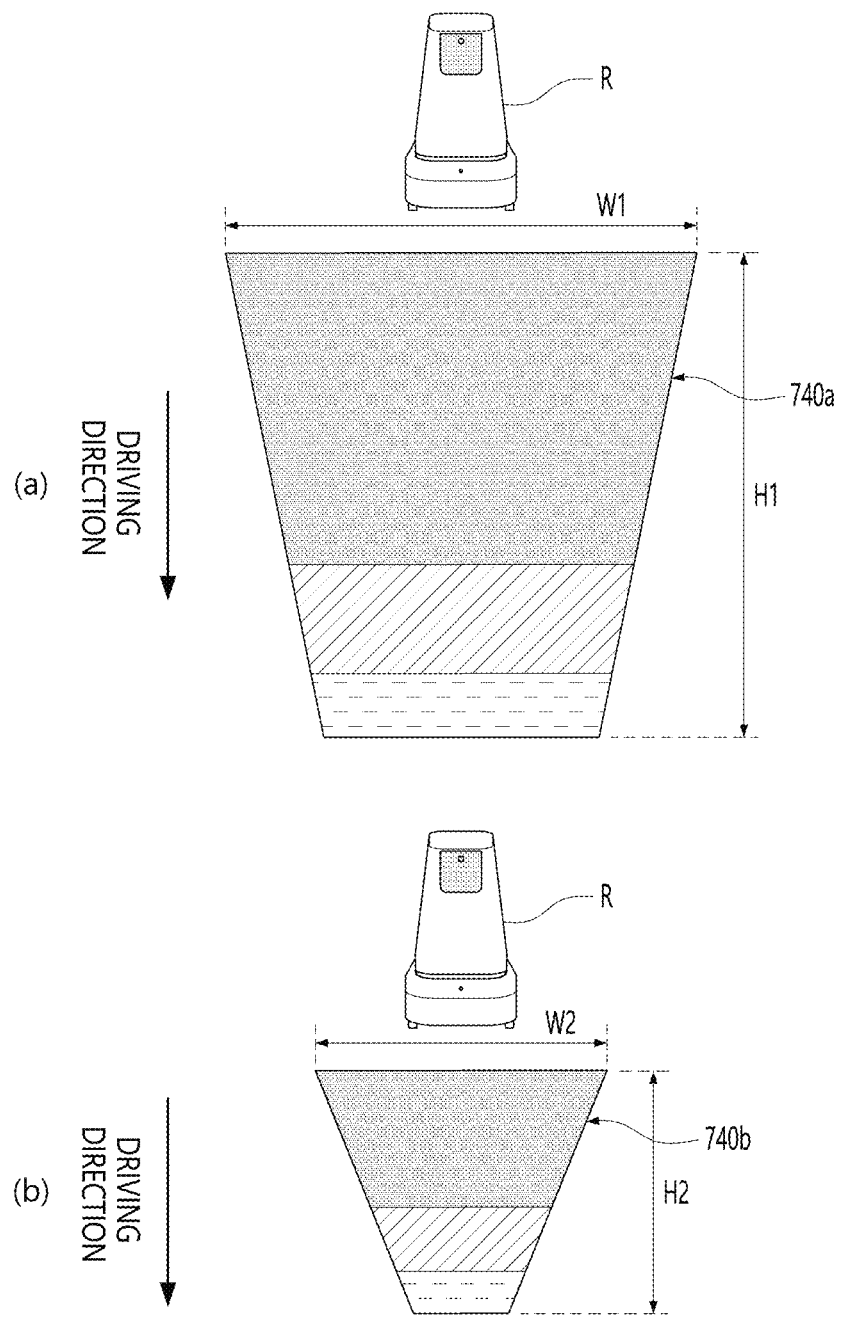
Figure 7E:
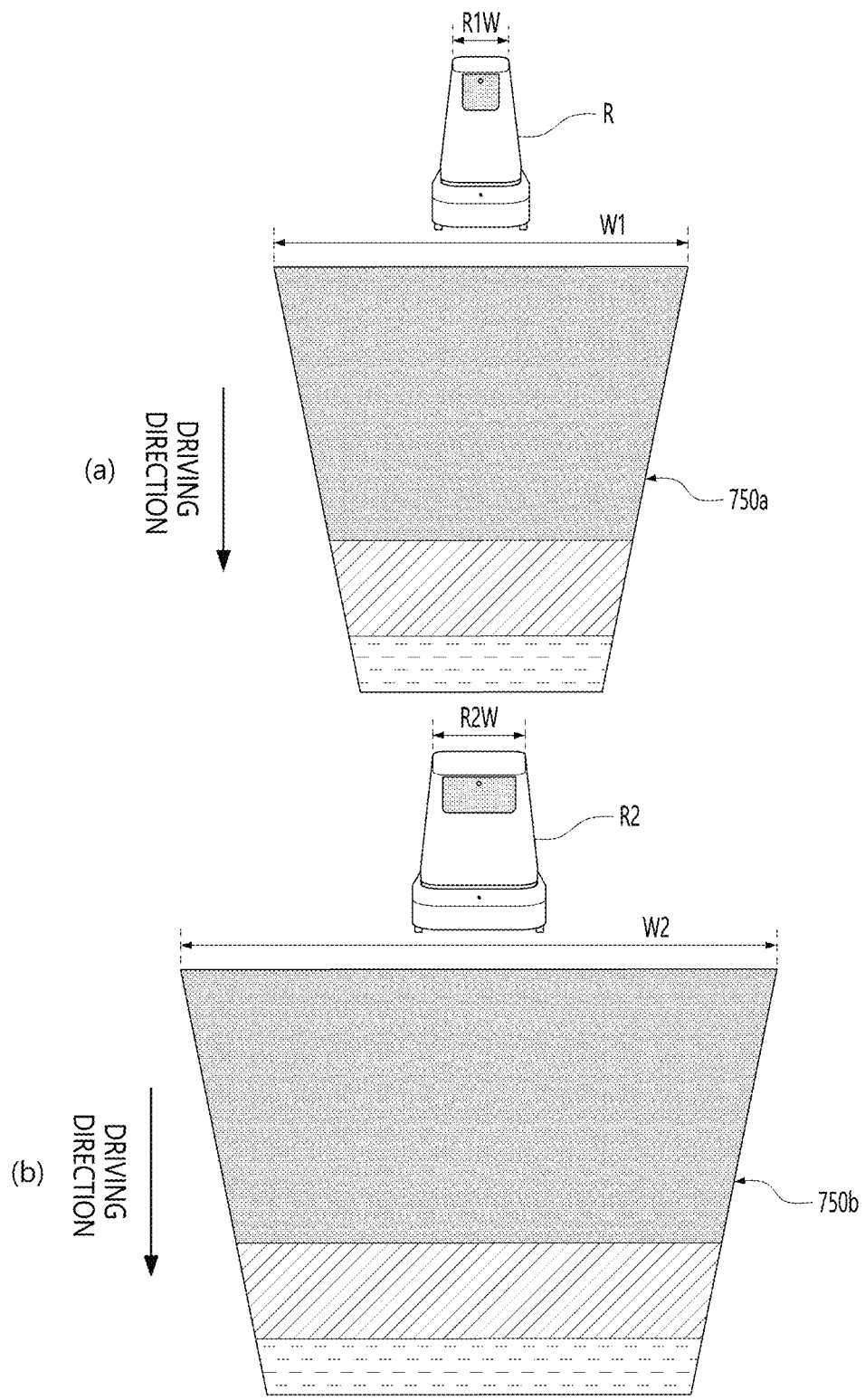

As shown in FIG. 7D, the controller 150 may differently control both lengths (H1, H2) and widths (W1, W2) of graphic objects based on a driving speed of the robot. As shown in items (a) and (b) of FIG. 7D, the controller 150 may differently control both the lengths and the widths of the graphic objects 740a, 740b based on a driving speed of the robot. Thus, the graphic objects 740a, 740b having different lengths and widths may be output to the display unit or the robot according to a driving speed of the robot.

The controller 150 may determine an output size of the graphic object by considering a physical size of the robot, as well as a driving attribute of the robot. As shown in items (a) and (b) of FIG. 7E, the controller 150 may differently set widths (W1, W2) of graphic objects 750a, 750b according to widths (R1W, R2W) of the robot.

The storage unit 120 may store therein information on a width of a graphic object based on a width of the robot. Such width information may mean threshold information on a minimum width of a graphic object according to a width of the robot. The controller 150 may control a width of a graphic object to be equal to or larger than a width corresponding to the threshold information, based on the threshold information. As shown, when the width (R1W) of the first robot (R1) is smaller than the width (R2W) of the second robot (R2), the width of the first graphic object 750a output in correspondence to the first robot (R1) may be smaller than the width of the second graphic object 750b output in correspondence to the second robot (R2).

Like this, according to at least some example embodiments, since the output size of the graphic object is controlled by considering the physical size of the robot, a safety accident which may occur due to the robot may be prevented.

In a case that the robot which moves forward in one direction changes its driving direction (e.g., rotation of the robot), a position of a dangerous region may be changed. For instance, when a driving direction of the robot is changed from item (a) of FIG. 7F to item (b) of FIG. 7F, a position of a dangerous region of the robot may be also changed. According to at least some example embodiments, in a case that a position of a dangerous region of the robot is changed as a driving direction of the robot is changed, an output position of a graphic object which indicates the dangerous region may be also changed.

Figure 7F:
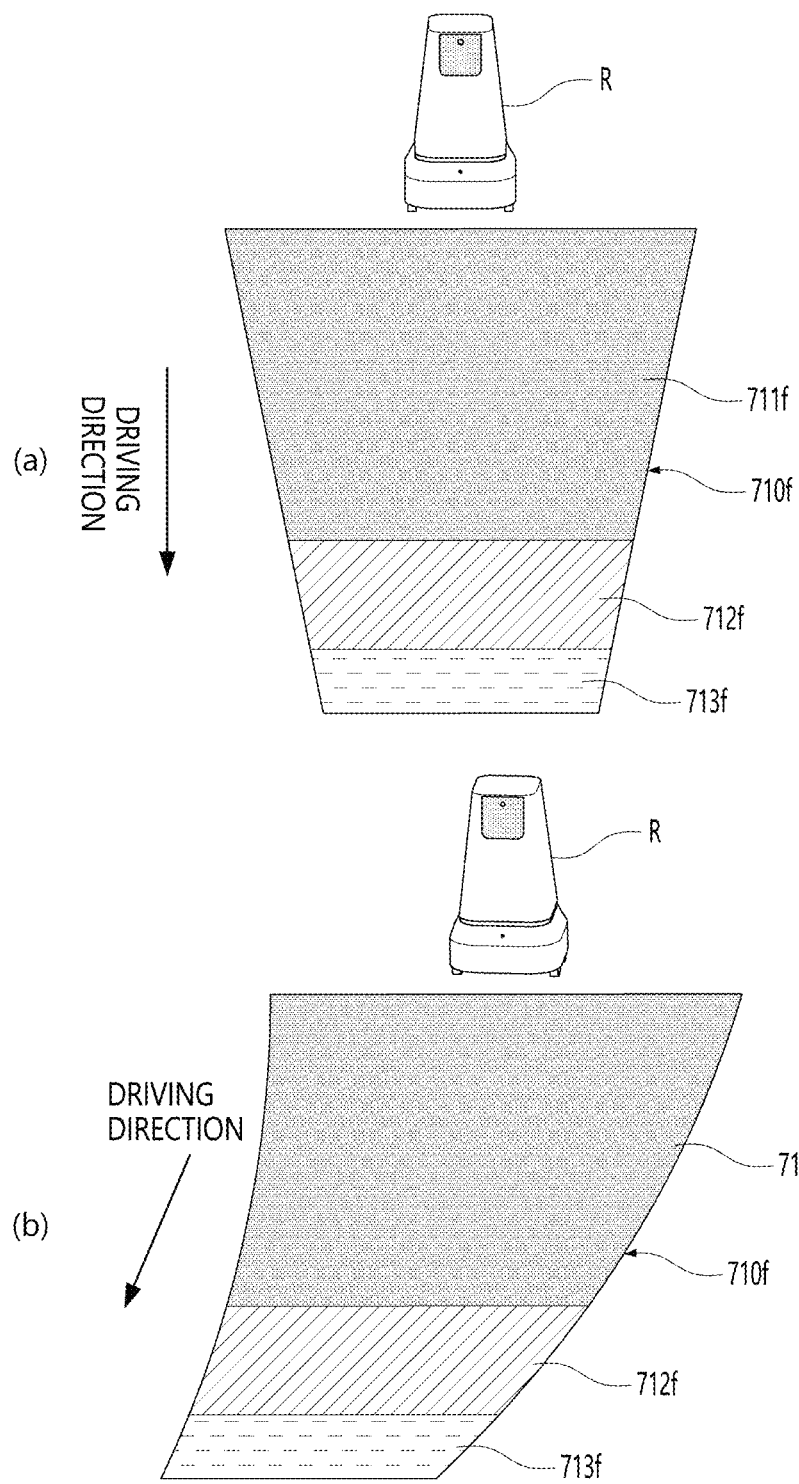

In this case, as shown in items (a) and (b) of FIG. 7F, the controller 150 may change a visual appearance of a graphic object 710f according to a rotation direction of the robot. In this case, as shown in item (b) of FIG. 7F, the graphic object 710f may be inclined towards the rotation direction of the robot, or may form a curved line. The controller 150 may intuitively inform a manager of a range of a dangerous region which occurs due to the rotation of the robot, by differently setting a gradient or a curvature of the graphic object 710f according to a rotation speed of the robot.

As shown in item (b) of FIG. 7F, the controller 150 may inform a rotation state of the robot by differently setting a gradient or a curvature of the graphic object 710f, only while the robot is being rotated. If the robot drives in one direction (e.g., a direction towards which a front surface of the robot faces) after completing the rotation, the controller 150 may control the graphic object 710f to be output towards the front surface of the robot, as shown in items (a) of FIG. 7F).

Further, the controller 150 may change a gradient or a curvature of the graphic object only when a rotation speed of the robot satisfies a preset condition. Here, the preset condition may mean a case that the robot rotates with a very high speed (a very drastic rotation) which may cause a danger to the periphery.

So far, has been explained a method to determine a visual characteristic of a graphic object based on driving information of the robot or a physical size of the robot. In the robot control method and system, a visual characteristic of a graphic object may be determined based on a characteristic of an object which is positioned in space, as well as driving information of the robot.

For instance, the controller 150 may extract an object which is positioned in space, from an image. Here, the object may mean a dynamic object which can move in space, such as a human and an animal. The controller 150 may determine an output size of a graphic object with consideration of such a dynamic object.

The controller 150 may determine an output size of a graphic object by considering a moving speed and a moving direction of a dynamic object from an image. Here, the controller 150 may define the output size of the graphic object by at least one of a length and a width of the graphic object.

Further, the controller 150 may determine areas of a plurality of regions in the graphic object by considering a moving speed and a moving direction of a dynamic object.

The controller 150 may determine a visual characteristic of a graphic object by using at least one of driving information of the robot and moving information of a dynamic object (e.g., a moving speed and a moving direction).

For instance, the controller 150 may control the display unit to output a large graphic object when a moving speed of a dynamic object is increased. Further, if a moving speed of a dynamic object is increased, the controller 150 may control the display unit such that a region matched with a first level indicating a highest risk degree in a graphic object has a large size. In this case, a region matched with a second level indicating a lowest risk degree may have a relatively small size.

Here, the controller 150 may control the display unit such that the size of the graphic object and the size of the region matched with the first level are increased, only in a case that a dynamic object moves towards the robot. The reason is because the robot has a low collision probability when a dynamic object moves in a distant direction from the robot.

In a case that a dynamic object moves in a distant direction from the robot, the controller 150 may control the display unit such that the size of the graphic object and the size of the region matched with the first level are decreased.

In this case, the region matched with the second level indicating a lowest risk degree may have a relatively large size.

As aforementioned, according to at least some example embodiments, the controller 150 may sense a dynamic object positioned in the space from the image. Here, the controller 150 may calculate a distance between the dynamic object and the robot, and may predict a collision probability between the dynamic object and the robot based on the calculated distance and a moving speed of the robot.

Such a collision probability may be differently predicted according to a characteristic of the dynamic object.

The characteristic of the dynamic object may be very variable.

For instance, when the dynamic object is a child, the controller 150 may predict that the collision probability is higher than in a case that the dynamic object is an adult.

As another example, when the dynamic object has a high moving speed, the controller 150 may predict that the collision probability is higher than in a case that the dynamic object has a low moving speed.

As still another example, when the dynamic object moves towards the robot, the controller 150 may predict that the collision probability is higher than in a case that the dynamic object moves in a distant direction from the robot.

As still another example, when the space is congested as a plurality of dynamic objects are positioned in the space, the controller 150 may predict that the collision probability is higher than in a case that the space is not congested.

As still another example, when the dynamic object positioned in the space has a posture in a direction to face the robot, the controller 150 may predict that the collision probability is higher than in a case that the dynamic object has a posture in a direction not to face the robot.

Like this, the controller 150 may predict a collision probability with the robot by considering a characteristic of a dynamic object positioned in the space, based on a preset algorithm. Here, the dynamic object positioned in the space may be sensed from an image received from the robot or a camera arranged in the space. Further, the preset algorithm may be an algorithm based on artificial intelligence or deep learning.

Based on such a collision probability, as shown in FIG. 8, guide information 830 related to driving of the robot may be output together with an image 810.

Information on such a collision probability with a dynamic object 1000 may be also utilized to determine a size of a graphic object. When a collision probability between the robot and a dynamic object is high, the controller 150 may control the display unit such that an output size of a graphic object and a size of a region matched with a first level indicating a highest risk are increased. The controller may transmit image data which reflects such a characteristic to the robot. And the robot may output a graphic object generated with consideration of a collision probability between the robot and the dynamic object, based on the image data.

As aforementioned, in the robot control method and system, an image is received from the robot, and a graphic object related to driving information of the robot may be displayed on the received image.

More specifically, according to at least some example embodiments, information for preventing a dangerous situation (e.g., a situation of a collision risk, etc.) which may occur due to driving of the robot may be provided through utilization of a graphic object. Thus, a manager who remotely manages the robot may stably manage and operate the robot even in a remote place, by referring to the graphic object.

At least some example embodiments may be executed by one or more processes in a computer, and may be implemented as a program which can be stored in a computer-readable medium.

Further, at least some example embodiments can be implemented as a computer-readable code or instruction word in a program-recorded medium. For example, at least some example embodiments may be embodied by a computer-readable medium storing computer-executable instructions that, when executed by a processor (e.g., a central processing unit (CPU), microprocessor, processor core, multi-core processor, multiprocessor, etc.) cause the processor to perform operations of at least some example embodiments (e.g., operations discussed above with respect to one or more of FIGS. 1-8).

The computer-readable medium includes all types of recording devices for storing data which can be read by a computer system. Examples of the computer-readable medium include a Hard Disk Drive (HDD), a Solid State Disk (SSD), a Silicon Disk Drive (SDD), ROM, RAM, CD-ROM, a magnetic tape, a floppy disk, an optical data storage device, etc.

Further, the computer-readable medium includes a storage unit which may be a server or a cloud storage unit to which an electronic device can access through communications. In this case, the computer may, from the server or the cloud storage unit, through wired or wireless communications, a program including program instructions for causing a processor executing the program instructions to implement example embodiments.

Further, according to at least some example embodiments, the aforementioned computer is an electronic device where a processor, i.e., a Central Processing Unit (CPU) is mounted, and there is no limitation in a type of the computer.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A robot control method, comprising:
receiving an image of a space where a robot drives;
receiving driving information related to driving of the robot, from the robot;
controlling a display unit to output a graphic object corresponding to the driving information, together with the image, the graphic object indicating a driving path of the robot based on the driving information such that the graphic object is inclined towards a driving direction of the robot in response to a change in the driving direction of the robot; and
determining and updating a visual characteristic of the graphic object based on the driving information, wherein
the controlling includes controlling the display unit to output the graphic object in an overlapping manner with the image, and
a gradient of the graphic object is set according to a rotation speed of the robot.

2. The method of claim 1,
wherein the graphic object includes a plurality of regions sequentially arranged in one direction, and
wherein the visual characteristic of the graphic object is related to an area of each of the plurality of regions in the graphic object.

3. The method of claim 2,
wherein each of the plurality of regions matches with a different risk level related to driving of the robot, and
wherein each of the plurality of regions is arranged in a gradually-distant direction from the robot.

4. The method of claim 3,
wherein a first level having a highest risk among the different risk levels is matched with a first region nearest to the robot among the plurality of regions, and
wherein a second level having a lowest risk among the different risk levels is matched with a second region farthest from the robot among the plurality of regions.

5. The method of claim 4, wherein the determining of the visual characteristic includes determining an area of each of the first region and the second region in the graphic object based on the driving information.

6. The method of claim 5,
wherein the driving information includes a driving speed of the robot,
wherein the determining of the visual characteristic comprises:
in response to the driving speed of the robot is increasing, determining the areas of the first and second regions in the graphic object such that the area of the first region in the graphic object is larger than the area of the second region, and
in response to the driving speed of the robot decreasing, determining the areas of the first and second regions in the graphic object such that the area of the first region in the graphic object is smaller than the area of the second region.

7. The method of claim 5, wherein the first region and the second region are displayed in different colors.

8. The method of claim 4, further comprising:
sensing, from the image, a dynamic object positioned in the space,
wherein the determining of the visual characteristic further includes changing the areas of the first region and the second region based on at least one of a moving direction and a moving speed of the dynamic object in the space.

9. The method of claim 4,
wherein the image is received from a camera having a driving direction of the robot as an angle of view, and
wherein the first region and the second region are sequentially arranged in one direction which is towards an upper side of the display unit from a lower side.

10. The method of claim 4,
wherein the image is received from a camera arranged in the space, and
wherein the image includes a robot image corresponding to the robot, and the graphic object is output to a periphery of the robot image based on a driving direction of the robot.

11. The method of claim 2, wherein the determining of the visual characteristic further includes changing at least one of a length or a width of the graphic object based on a driving speed of the robot.

12. A robot control system, comprising:
a display unit;
a communication unit configured to receive an image about a space where a robot drives, and driving information related to driving of the robot; and
a controller configured to control the display unit to output a graphic object corresponding to the driving information, together with the image, the graphic object indicating a driving path of the robot based on the driving information such that the graphic object is inclined towards a driving direction of the robot in response to a change in the driving direction of the robot, wherein
the controller is further configured to control the display unit to output the graphic object in an overlapping manner with the image at a position corresponding to the driving direction of the robot, and
a gradient of the graphic object is set according to a rotation speed of the robot.

13. A building where a robot drives according to a safe guide line, the building comprising:
an indoor region, of the building, for a robot to drive in according to a safe guide line included in the indoor region;
a plurality of cameras arranged in the indoor region; and
a cloud server configured to communicate with the robot to receive an image about a space where the robot drives from the plurality of cameras, wherein
the cloud server is further configured to control a display unit to output a graphic object related to safety information for safely driving the robot in the indoor region together with the image, the graphic object indicating a driving path of the robot based on driving information of the robot such that the graphic object is inclined towards a driving direction of the robot in response to a change in the driving direction of the robot,
the cloud server is further configured to determine a visual characteristic of the graphic object based on the driving information of the robot, and
a gradient of the graphic object is set according to a rotation speed of the robot.

14. The building of claim 13,
wherein the cloud server is further configured to control the display unit such that outputting of the graphic object includes outputting the graphic object in an overlapping manner with the image,
wherein the graphic object includes a plurality of regions sequentially arranged in one direction, and
wherein the visual characteristic of the graphic object is related to an area of each of the plurality of regions in the graphic object.

15. The building of claim 14,
wherein each of the plurality of regions matches with a different risk level related to driving of the robot, and
wherein each of the plurality of regions is arranged in a gradually-distant direction from the robot.

16. The building of claim 15,
wherein a first level having a highest risk among the different risk levels is matched with a first region nearest to the robot among the plurality of regions, and
wherein a second level having a lowest risk among the different risk levels is matched with a second region farthest from the robot among the plurality of regions.

17. The building of claim 16, wherein the cloud server is further configured to determine an area of each of the first region and the second region in the graphic object based on the driving information.

* * * * *